US012643112B2

(12) United States Patent
Deemer et al.

(10) Patent No.: US 12,643,112 B2
(45) Date of Patent: Jun. 2, 2026

(54) ELECTROSTATIC PRECIPITATOR WITH ROTARY COLLECTING WALLS

(71) Applicant: Nestec, Inc., Pen Argyl, PA (US)

(72) Inventors: Jaymie Carl Deemer, Grand Rapids, MI (US); James T. Cash, Hackettstown, NJ (US)

(73) Assignee: Nestec, Inc.

( * ) Notice: Subject to any disclaimer, the term of this patent is extended or adjusted under 35 U.S.C. 154(b) by 657 days.

(21) Appl. No.: 17/949,670

(22) Filed: Sep. 21, 2022

(65) Prior Publication Data

US 2023/0100405 A1 Mar. 30, 2023

Related U.S. Application Data

(60) Provisional application No. 63/246,531, filed on Sep. 21, 2021.

(51) Int. Cl.

*B03C 3/74* (2006.01)
*B03C 3/16* (2006.01)
*B03C 3/49* (2006.01)

(52) U.S. Cl.

CPC ................ *B03C 3/743* (2013.01); *B03C 3/16* (2013.01); *B03C 3/49* (2013.01)

(58) Field of Classification Search

CPC .. B03C 3/743; B03C 3/14; B03C 3/10; B03C 3/16; B03C 3/49; B03C 3/47; B03C 3/25; B03C 3/41

See application file for complete search history.

(56) References Cited

U.S. PATENT DOCUMENTS 1,575,165 A * 3/1926 Hopkinson ............. B03C 3/743 209/129
3,742,681 A * 7/1973 deSeversky ............... B03C 3/16 96/45

(Continued)

FOREIGN PATENT DOCUMENTS

CN 107377217 A 11/2017
CN 108772199 A 11/2018

(Continued)

OTHER PUBLICATIONS

International Search Report dated Feb. 27, 2023, issued in corresponding Application No. PCT/US22/44265.

(Continued)

*Primary Examiner* — Jennifer Dieterle
*Assistant Examiner* — Sonji Turner
(74) *Attorney, Agent, or Firm* — The Belles Group, P.C.

(57) ABSTRACT

An electrostatic precipitator in one embodiment includes an outer housing defining an internal space, and a primary collector disposed therein which comprises a pair of nested inner and outer radial collecting walls. A collection annulus is formed between the walls which receives a flowing process gas stream. Electrodes within the annulus electrically charge particles entrained in the gas stream which electrostatically adhere to the collecting walls. In one embodiment, the collecting walls rotate through a stationary cleaning station in the housing which includes mechanical devices such as scrapers to automatically and mechanically remove the collected particles from the walls. The devices may be vertical drag chains with scrapers coupled thereto in one embodiment. The precipitator may be a wet electrostatic (Continued)

precipitator which treats an incoming wetted gas stream. The precipitator is especially adapted to remove sticky type particulate from the collecting walls.

16 Claims, 19 Drawing Sheets

(56) References Cited

U.S. PATENT DOCUMENTS

| | | | | | |
|---|---|---|---|---|---|
| 3,856,476 | A * | 12/1974 | De Seversky | B03C 3/53 422/906 |
| 3,891,414 | A * | 6/1975 | Snader | B03C 3/88 96/28 |
| 3,929,436 | A * | 12/1975 | Kim | B03C 3/743 96/51 |
| 4,181,509 | A | 1/1980 | Drlik et al. | |
| 4,185,971 | A | 1/1980 | Isahaya | |
| 4,256,468 | A | 3/1981 | Mazer et al. | |
| 4,281,759 | A * | 8/1981 | Pentith | B65G 19/18 198/598 |
| 4,539,022 | A | 9/1985 | Mcloughlin | |
| 5,429,669 | A * | 7/1995 | Chang | B03C 3/47 95/76 |
| 6,783,575 | B2 | 8/2004 | Pasic et al. | |
| 7,582,144 | B2 * | 9/2009 | Krigmont | B03C 3/025 96/99 |
| 7,582,145 | B2 * | 9/2009 | Krigmont | B03C 3/64 96/99 |
| 7,597,750 | B1 * | 10/2009 | Krigmont | B03C 3/08 96/49 |
| 7,833,324 | B2 | 11/2010 | Chen et al. | |
| 8,088,198 | B2 | 1/2012 | Bengtsson et al. | |
| 8,211,217 | B2 | 7/2012 | Tsai et al. | |
| 8,728,204 | B2 | 5/2014 | Shulfer | |
| 8,876,950 | B2 | 11/2014 | Ma et al. | |
| 8,945,423 | B2 | 2/2015 | Cash et al. | |
| 10,150,120 | B2 * | 12/2018 | Seeley | B03C 3/41 |
| 10,449,554 | B2 | 10/2019 | Henriquez Prevoo et al. | |
| 10,751,729 | B2 | 8/2020 | Tolvanen | |
| 10,792,674 | B2 | 10/2020 | Scharkowski et al. | |
| 10,864,526 | B2 | 12/2020 | Johnsgard et al. | |
| 2003/0217642 | A1 | 11/2003 | Pasic et al. | |
| 2012/0222550 | A1 * | 9/2012 | Ellis | B01D 53/1456 95/71 |
| 2013/0265574 | A1 * | 10/2013 | Buckley | G01N 21/67 356/313 |
| 2015/0027369 | A1 * | 1/2015 | Clements | B03C 3/743 118/723 R |
| 2018/0029043 | A1 * | 2/2018 | Henriquez Prevoo | B03C 3/78 |
| 2023/0173507 | A1 * | 6/2023 | Cash | B03C 3/16 95/75 |
| 2024/0307891 | A1 * | 9/2024 | Hann | B03C 3/49 |

FOREIGN PATENT DOCUMENTS

| | | | | |
|---|---|---|---|---|
| CN | 112833510 | A | | 5/2021 |
| CN | 112844843 | A | | 5/2021 |
| DE | 102008049211 | A1 | | 4/2010 |
| GB | 1538153 | A | | 1/1979 |
| JP | S5348283 | A | * | 5/1978 |
| WO | 2021/081565 | A2 | | 4/2021 |

OTHER PUBLICATIONS

K. Abe et al., Latest Application of Moving Electrode Electrostatic Precipitator (MEEP), Mitsubishi Hitachi Power Systems Environmental Solutions, Ltd., Retrieved Sep. 22, 2022, pp. 1-5.

Zhenga Yang et al., Fine particle migration and collection in a wet electrostatic precipitator., Journal of the Air & Waste Management Association, ISSN: 1096-2247 (Print) 2162-2906 (Online) Journal homepage: https://www.tandfonline.com/loi/uawm20., Retrieved Sep. 22, 2022, pp. 1-10.

Reyes et al., Use of HV Three-phase Rectifiers in Electrostatic Precipitators, International Journal of Plasma Environmental Science & Technology, vol. 8, No. 1, Apr. 2014, Retrieved Sep. 22, 2022, pp. 17-21.

C. Nagata et al., Historical Review of Wet type Electrostatic Precipitator Technology for Industrial and Power Applications in MHI-MS, International Journal of Plasma Environmental Science & Technology, vol. 8, No. 1, Apr. 2014, Retrieved Sep. 22, 2022, pp. 27-36.

Naruhito Omine et al., AQCS (Air Quality Control System) for Thermal Power Plants Capable of Responding to Wide Range of Coal Properties and Regulations, Mitsubishi Heavy Industries Technical Review vol. 54 No. 3 (Sep. 2017), Retrieved Sep. 22, 2022, pp. 55-62.

H. Ando et al., Recent Technology of Moving Electrode Electrostatic Precipitator, International Journal of Plasma Environmental Science & Technology, vol. 5, No. 2, Sep. 2011, Retrieved Sep. 22, 2022, pp. 130-134.

A. Bologa et al., Novel Wet Electrostatic Precipitator for Sub-Micron Particles, Conference Paper—Jan. 2007, https://www.researchgate.net/publication/230558144_Novel_wet_electrostatic_precipitator_for_sub-micron_particles, Retrieved Sep. 22, 2022, pp. 1-10.

Wen-Jey Liang et al., The Characteristics of Ionic Wind and Its Effect on Electrostatic Precipitators, Aerosol Science and Technology, 20:4, 330-344, DOI:10.1080/02786829408959689, https://doi.org/10.1080/02786829408959689, Published online: Jun. 12, 2007, Retrieved Sep. 22, 2022, pp. 330-344.

Hardikkumar G. Shah, Performance Evaluation of Wet Plate ESP for Sub-Micron Particles, A Thesis Presented to the Faculty of the Russ College of Engineering and Technology of Ohio University, Mar. 2006, Retrieved Sep. 22, 2022, pp. 1-71.

Knapik, John., Understanding ESP Controls, WPCA—Ameren ESP Seminar, © 2004, General Electric Company, Retrieved Sep. 22, 2022, pp. 1-74.

Robert Allan, 3-D Computational Modeling of Wet Electrostatic Precipitators to Control Submicron Particulate Emissions, Retrieved Sep. 22, 2022, pp. 1-4.

Morshad, M.G., ESP Rectifier Transformer, (Slideshow), Retrieved Sep. 22, 2022, pp. 1-35.

Partial European Search Report dated Jul. 30, 2025, issued in corresponding EP Application No. 22873529.6.

Extended European Search Report 22873529.6 , Issued on Dec. 17, 2025.

* cited by examiner

ELECTROSTATIC PRECIPITATOR WITH ROTARY COLLECTING WALLS

CROSS-REFERENCE TO RELATED APPLICATIONS

This present application claims the benefit of U.S. Provisional Application No. 63/246,531 filed Sep. 21, 2021, which is incorporated herein by reference in its entirety.

BACKGROUND

The present invention relates generally to electrostatic precipitators for removing particles from a process gas stream, and more particularly to a such an apparatus in one embodiment which utilizes rotating particle collectors and mechanical particle cleaning devices.

Electrostatic precipitation has been around for over 100 years and is very useful for product recovery or for pollution control purposes. In either application, an electrostatic precipitator operates to remove and collect particles or particulate from a gas stream. The term "gas" is used broadly herein and is to be construed to include air or gases of any other composition.

Electrostatic precipitators are further categorized into one of two types, "wet" or "dry" systems. "Dry" electrostatic precipitators often called simply "ESP's" refers to electrostatic collectors that do not saturate the gas stream prior to removal/collection, and typically use mechanical means of dislodging and collecting the particulate by means of rapping, shaking, sonic vibration, or combinations of these. The gas stream therefore generally remains in a dry condition. In some cases, however, water or fluid cleaning may be periodically used to dislodge stubborn particles from the collector surfaces of the ESPs.

"Wet" electrostatic precipitators are most often used when the gas steam contains sticky material and/or droplets and aerosols. These wet electrostatic precipitators, which are generally referred to as a WESP, treat wetted saturated or near saturated gas streams. Quenching water may be introduced into the gas flow upstream of the WESP to wet the gas stream. When the collected particles gradually builds up on the collecting surface of the WESP with either high solids or with sticky material, the most common cleaning system uses water and soaps sprayed onto the collector to loosen and flush the accumulated material out.

Industries dealing with aerosols, fine particulates, and sticky condensables in the gas stream will favor the WESP style, and almost always use a water wash system to clean the collector. Such industries include panel board and biomass production. The panel board industry converts trees into useful products such as plywood, MDF, OSB, siding and paneling. Biomass is a growing industry in the energy sector and predominantly consists of the manufacture of wood pellets. Burning wood pellets rather than coal reduces greenhouse gasses and therefore global warming by using carbon neutral fuels instead of carbon that is sequestered. The most common source of the biomass is trees. Both panel board and pellets start with wood that is cut, shaved or hammered into smaller sizes, and then dried to remove most of the water from the material. The exhaust from the dryer contains fine particulate, aerosols and condensable organic material. Emission regulations require removal of these contaminants and a WESP is the most common form of emission control. In some countries it is the only form of emission control used.

Characteristics of the foregoing process present a significant challenge for a WESP. To clean off the accumulated buildup on the collector, a combination of heating flushing/cleaning water, adding caustic soap, and dousing the surfaces with a heavy stream of the water for several minutes is required. In doing so, the collected material that was considered an air pollutant is now suspended in a large volume of water and thus now a water pollution problem. Dissolved and suspended solids must be continuously removed from this water or it will quickly become a sludge and would be expensive if not impossible to dispose of.

Accordingly, there remains a need for improved wet electrostatic precipitator systems which can minimize the use of flushing/cleaning water hand/or chemicals to remove captured particles from the collecting surfaces of the precipitators.

BRIEF SUMMARY

The present application provides an improved electrostatic precipitator system utilizing a mechanical system to remove material collected from a process gas stream (particles or particulate) from the collecting surfaces of the precipitator. The electrostatic precipitator may be a WESP (wet electrostatic precipitator) in one embodiment which treats a wetted process gas stream. The process gas may be pressurized and/or heated above ambient temperatures in some embodiments depending on the application and type of process gas being treated. The term "gas" is broadly used herein to include air and/or other type of gas which may contain and comprises various types of chemical constituents, organic and inorganic matter, particles, compounds, and other.

Advantageously, the WESP described herein continuously cleans particulate matter deposits off the collector surfaces while the unit remains in service to continue collection of particles. This differs from past WESP or dry electrostatic precipitators which typically require the collectors to be taken out of service for cleaning. Those past systems therefore require redundant capacity and equipment to keep treating the gas stream, thereby resulting in greater capital costs for the given installation. Such redundancy is not required with WESP embodiments of the present invention.

Also as noted above, industrial WESPs efficiently remove particles and aerosols from a gas stream at high efficiency and low pressure drop by first saturating the incoming gas stream with liquid such as water, followed by electrically charging the particles entrained in the gas stream, and then collecting them on the electrically grounded collecting surfaces. A cleaning or flushing system as most been often employed alone heretofore to wash the collected material or particles off the collector surfaces and electrode(s) in order to restore them to a clean condition for continued operation. This approach however results in transferring the air pollution problem to a water pollution problem.

The present invention disclosed advantageously eliminates or at least minimizes the need for and use of water (in a liquid or steam state) for collector cleaning thus reducing both water usage and concomitantly generation of contaminated wastewater which must be treated. In some cases, the need for caustic cleaning chemical solvents if required is eliminated or minimized as well.

Although embodiments of the invention illustrated and described herein reference to a wet electrostatic precipitator, other embodiments of the disclosed invention can used in dry electrostatic precipitator systems with equal benefit for either product recovery or pollution control applications, as well. Accordingly, embodiments of the disclosed invention have broad applicability in the industrial sector in a diversity of industries.

Non-limiting embodiments of the present wet electrostatic precipitator or WESP generally comprise slow-moving radial collecting walls. In one embodiment, two concentric vertical collecting walls rotating around a common vertical centerline axis of the unit may be used with at least one high voltage electrode placed between the pair of collecting walls in the collection annulus formed between the walls. A plurality of circumferentially spaced apart electrodes may be used in practice. The collecting walls may be cylindrical in one construction and formed of metallic cylinders or shells with one inner wall nested inside the other.

In operation briefly, the electrode emits a corona and electrically charges the particles entrained in the gas stream to be treated, which may flow either upward or downward between the collecting walls. The collecting walls each define a respective collecting surface which is electrically ground to electrostatically attract and collect the particles removed from the gas flow. The rotating collecting walls advantageously pass through a stationary cleaning section with each revolution which is configured to fluidly isolate the electrostatic collection process from the wall cleaning process without interrupting the gas flow and continued operation of the collection unit.

The cleaning station of the present WESP includes one or more particulate cleaning devices configured to mechanically clean and remove adhered particles from the rotating collecting walls prior to the walls rotating out of and exiting the stationary cleaning station. In one non-limiting embodiment, the cleaning devices may be moving and circulating drag chains with scrapers thereon positioned slideably engage and remove particulate matter deposits from the collecting walls. Advantageously, the particles can removed from the collecting walls in a WESP without or with minimal use of cleaning water (in liquid or steam form) and/or chemicals, thereby largely eliminating the water pollution problem associated with WESPs of past designs.

In alternative embodiments, the radial collecting walls could possibly instead remain stationary and the mechanical cleaning station could travel around the collecting walls if interference with the high voltage emitting electrodes could be avoided.

In some embodiments to achieve higher particulate removal efficiency from the gas stream, a multistage electrostatic precipitator may be employed. In such a precipitator, the parallel rotating radial collecting walls (primary collection stage) may be followed by a secondary collection stage comprising in one embodiment a cassette of plate style collectors which have alternating charged and grounded plates. Gas flows through the primary collector which may remove 90% or more of the particles in the incoming wetted gas stream and then into the secondary collector which may be used as final trim or polishing step to remove the remaining particles to the extent needed. This provides a customizable two-stage WESP design which allows for varying the size and spacing of the secondary field collectors to suit the final particulate collection needs and efficiency of a particular application based on the type of particles encountered. In one embodiment, the secondary collector may be mounted inside the same housing which contains the primary rotating collecting wall collector.

According to one aspect, an electrostatic precipitator system comprises: a primary collector comprising: an outer collecting wall circumscribing an inner collecting wall to define a collection annulus therebetween to receive an incoming gas stream therethrough; and an electrode disposed in the collection annulus, the electrode configured to be energized to electrically charge particles entrained in the incoming gas stream to cause the electrically charged particles to electrostatically collect on the inner and outer collecting walls; and a cleaning station configured to remove the collected particles from the inner and outer collecting walls while the electrode remains energized. The inner and outer collecting walls are formed by cylindrical shells each being annular in structure and being rotatable about a common rotational axis via a rotary drive mechanism. The inner and outer collecting walls may be rotate through the cleaning station. The precipitator may be a wet electrostatic precipitator. The electrode may have a rod-like structure or an annular structure.

According to another aspect, a method for treating a gas stream comprises: providing an electrostatic precipitator including at least one collecting wall defining a convex or concave annular collecting surface, the at least one collecting wall being electrically grounded; rotating the at least one collecting wall; energizing at least one electrode spaced apart from the collecting surface; flowing the gas stream along the collection surface and the at least one electrode; removing the particles from the gas stream; and collecting particulate comprising the particles on the collecting surface. The method may further comprise rotating the at least one collecting wall through a stationary cleaning station, and removing the particulate from the collecting wall. The particulate may be mechanically removed from the at least one collecting wall by scraping. The at least one electrode may have a rod-like structure or an annular structure.

According to another aspect, a method for cleaning an electrostatic precipitator comprises: providing the electrostatic precipitator including a pair of concentrically nested collecting walls containing particulate matter deposits thereon; rotating the pair of collecting walls through a cleaning compartment; and removing the particulate matter deposits from the collecting walls while the collecting walls are rotating. The particulate matter deposits may be mechanically removed by scraping in the cleaning compartment. The precipitator may be a wet electrostatic precipitator.

According to another aspect, an electrostatic precipitator system comprises: at least one annular collecting wall; a rotary drive mechanism operably coupled to the at least one annular collecting wall to rotate the at least one annular collecting wall about a rotational axis; at least one electrode configured to electrically charge particles entrained in an incoming gas stream flowing adjacent the at least one annular collecting wall to cause the electrically charged particles to electrostatically collect on a collecting surface of the at least one annular collecting wall; and a cleaning station positioned so that the at least one collecting wall rotates through the cleaning station to remove the collected particles from the at least one collecting wall. The electrostatic precipitator system is configured to operate the cleaning station concurrently with energizing the electrode while the incoming gas stream is flowing adjacent the at least one annular collecting wall. The precipitator may be a wet electrostatic precipitator. The at least one electrode may have a rod-like structure or an annular structure.

According to another aspect, a wet electrostatic precipitator system comprises: a sprayer configured to wet an incoming gas stream; at least one collecting wall; at least one electrode configured to electrically charge particles entrained in the wetted gas stream flowing adjacent the at least one collecting wall to cause the electrically charged particles to electrostatically collect on a collecting surface of the at least one collecting wall; a mechanism for generating relative movement between the at least one collecting wall and the cleaning station; and the cleaning station comprising one or more scrapers configured to scrape the collected particles from the at least one collecting wall. The at least one electrode may have a rod-like structure or an annular structure.

BRIEF DESCRIPTION OF THE DRAWINGS

The present invention will become more fully understood from the detailed description and the accompanying drawings, wherein like elements are labeled similarly and in which.

Figure 1:
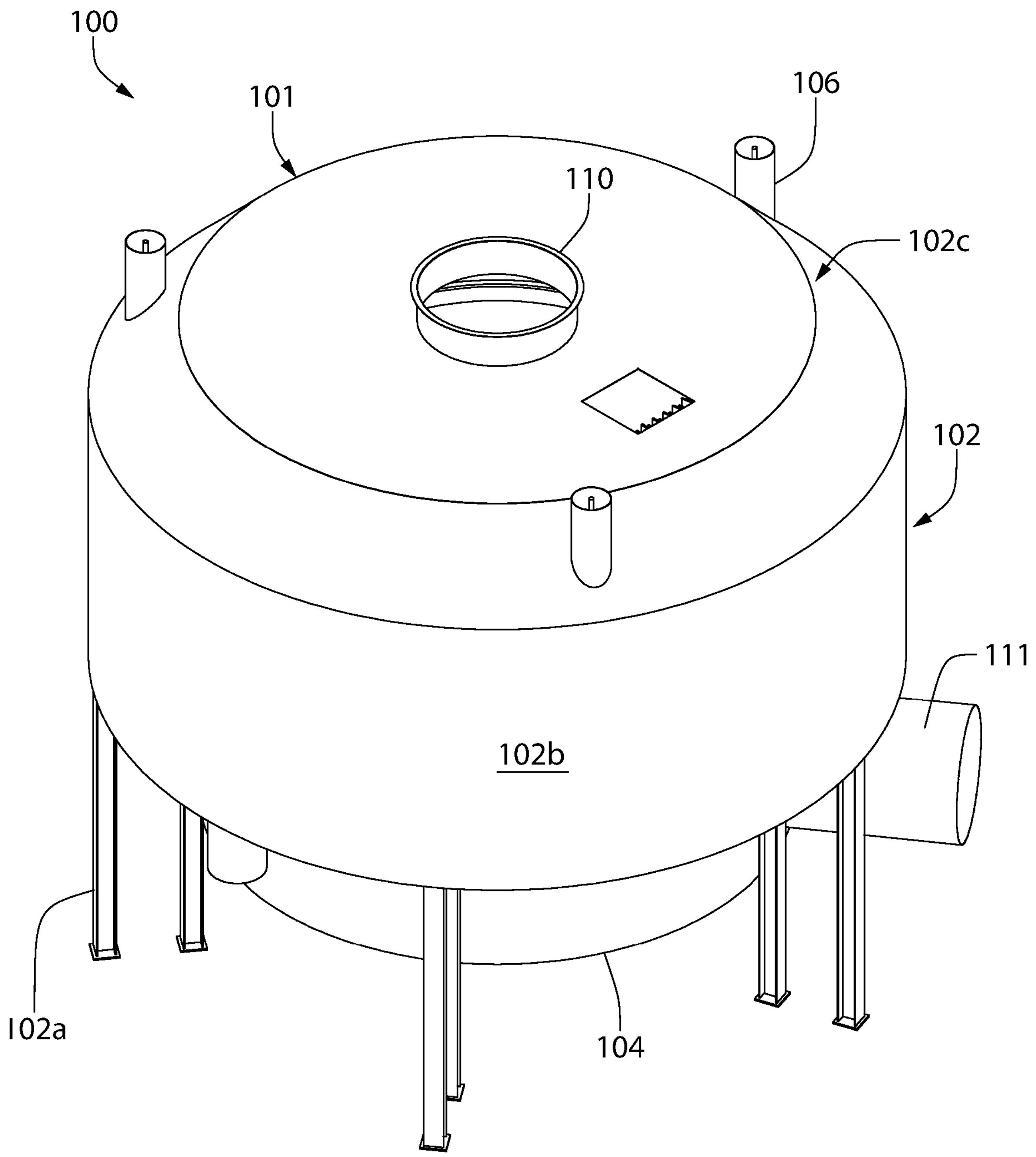
FIG. 1 is top perspective view of an electrostatic precipitator according to the present disclosure.
Figure 2:
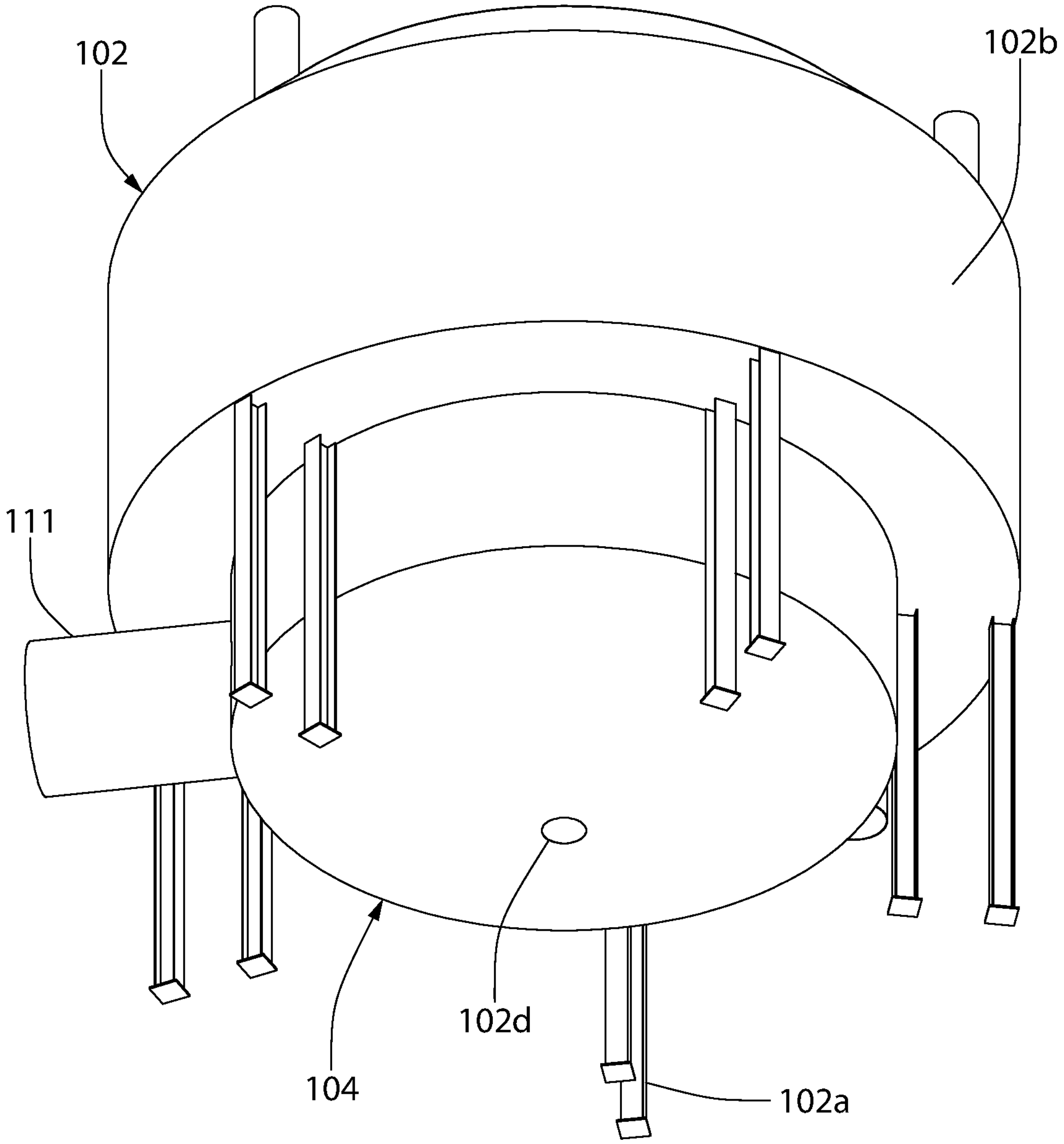
FIG. 2 is a bottom perspective view thereof.
Figure 3:
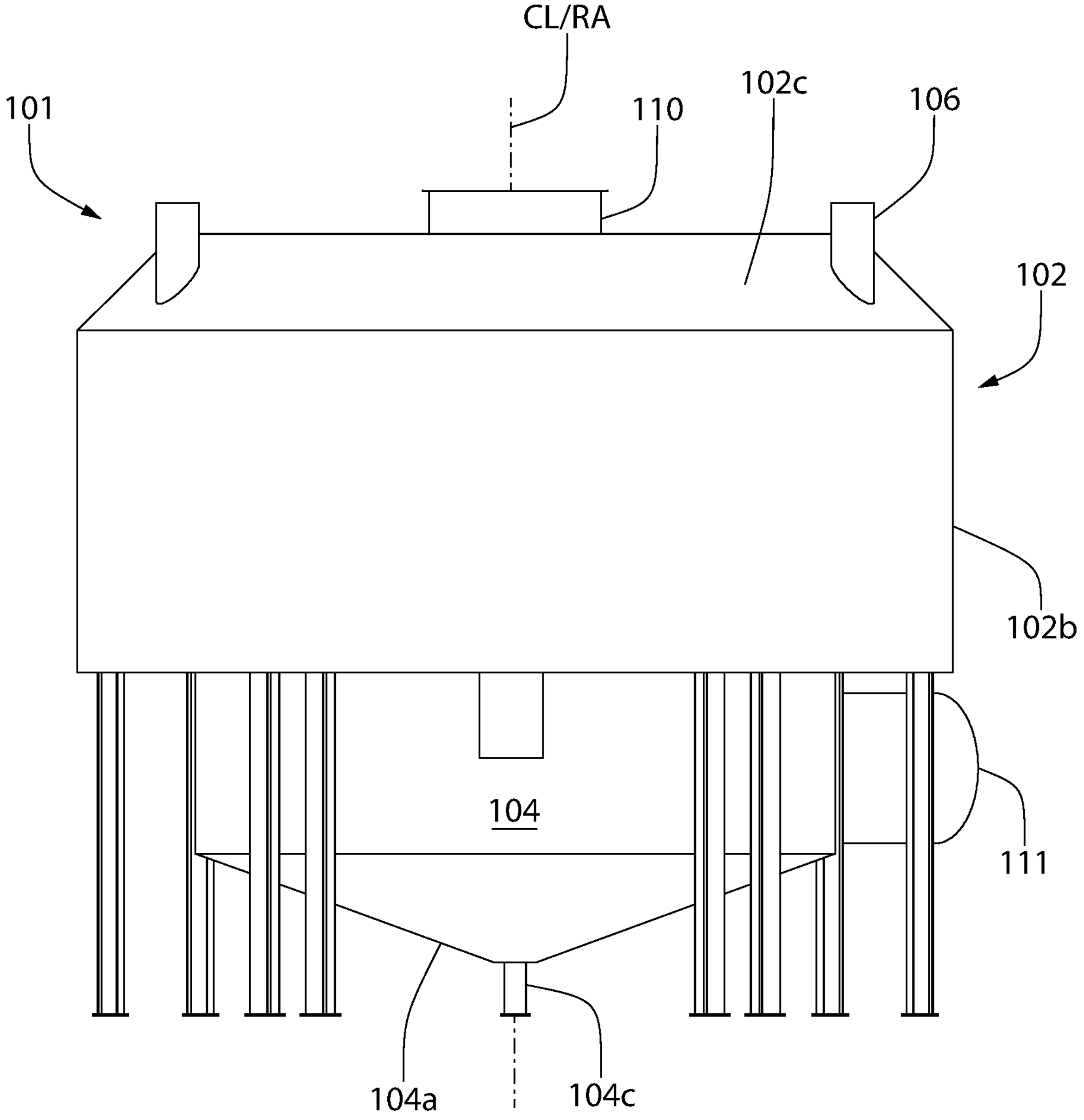
FIG. 3 is a first side view thereof.
Figure 4:
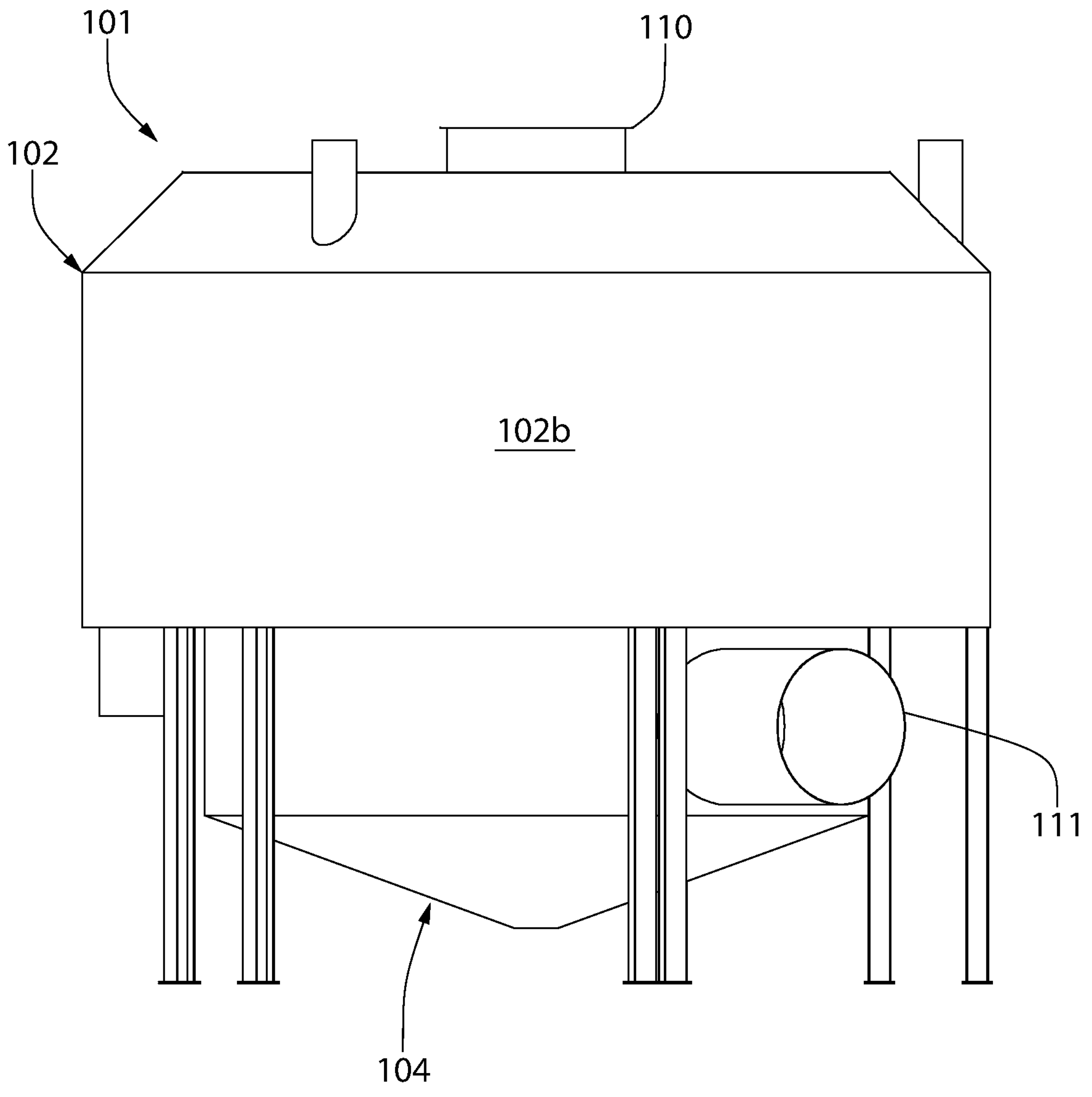
FIG. 4 is a second side view thereof.
Figure 5:
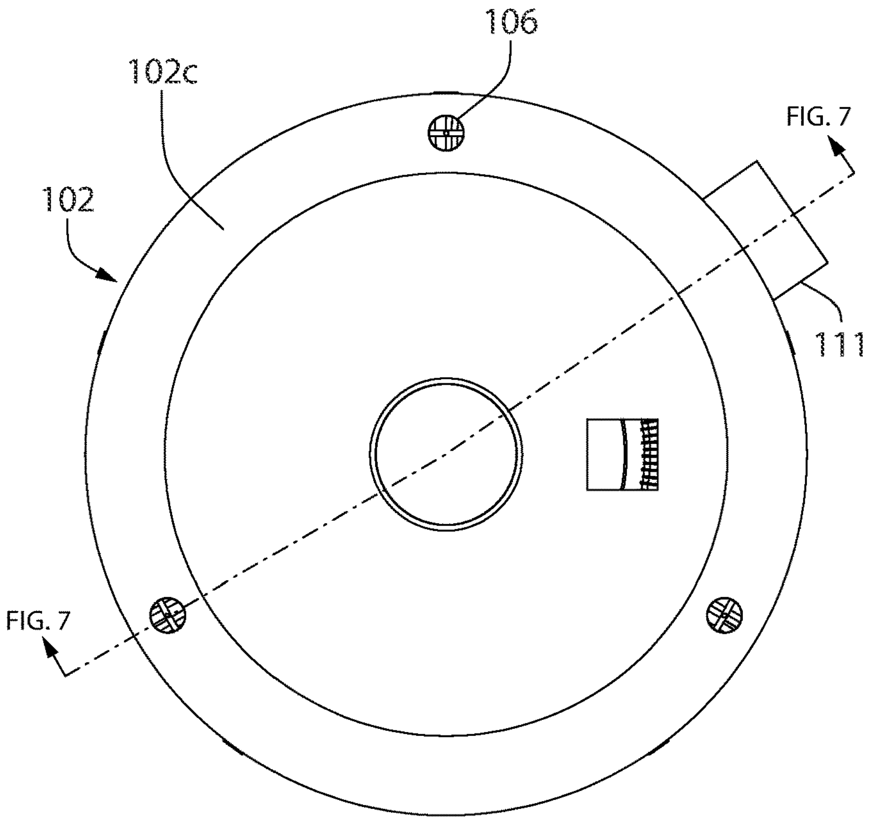
FIG. 5 is a top view thereof.
Figure 6:
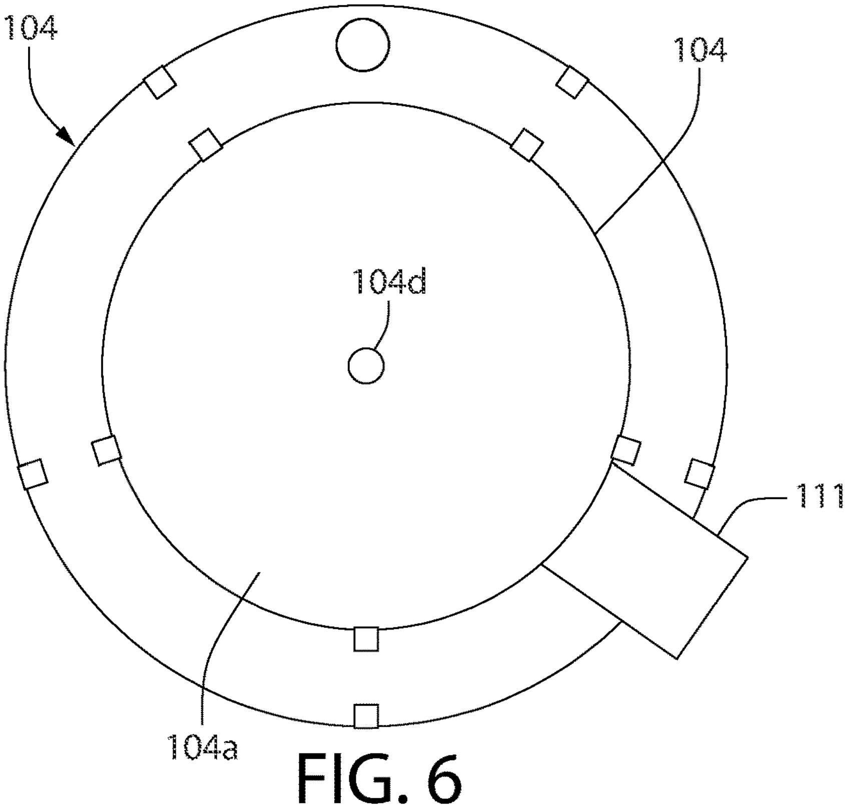
FIG. 6 is a bottom view thereof.
Figure 7:
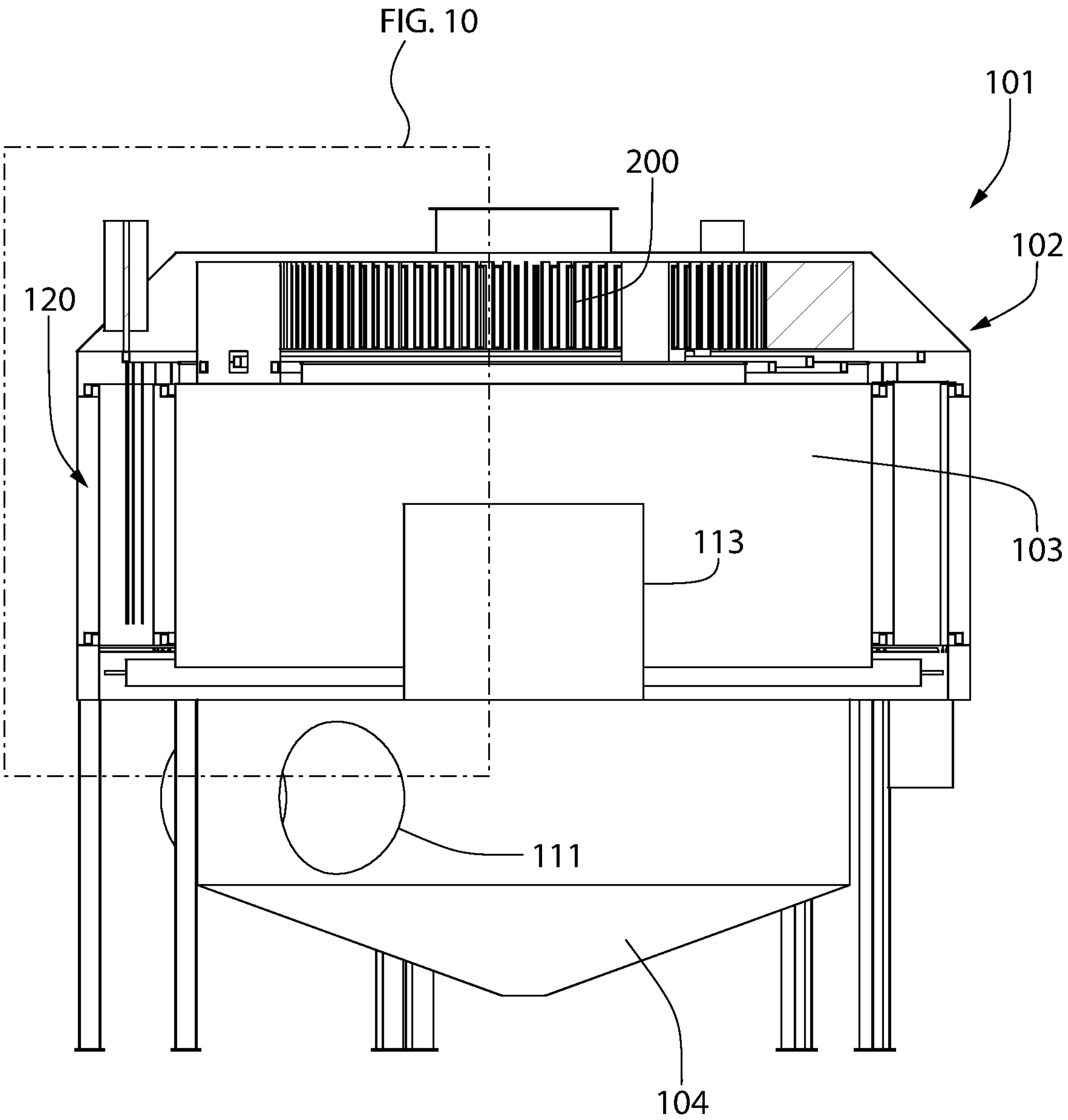
FIG. 7 is a side cross-sectional view thereof.

All drawings may be considered schematic and not necessarily to scale. Features shown numbered in certain figures which may appear un-numbered in other figures are the same features unless noted otherwise herein. A general reference herein to a figure by a whole number which includes related figures sharing the same whole number but with different alphabetical suffixes shall be construed as a reference to all of those figures unless expressly noted otherwise.

DETAILED DESCRIPTION

The features and benefits of the invention are illustrated and described herein by reference to non-limiting exemplary ("example") embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. The term annulus or annular shall be construed to refer to circular or ring-shaped structure or space depending on the context used herein which includes oblong, oval, and round.

As used throughout, any ranges disclosed herein are used as shorthand for describing each and every value that is within the range. Any value within the range can be selected as the terminus of the range. In addition, any references cited herein are hereby incorporated by reference in their entireties. In the event of a conflict in a definition in the present disclosure and that of a cited reference, the present disclosure controls.

FIGS. 1-19 show various aspects of a wet electrostatic precipitator (WESP) system 100 according to the present disclosure. The system includes WESP 101 which comprises an outer housing 102 defining an interior or internal space 103 configured for the holding one or more collectors. Housing 102 may be vertically oriented in one embodiment and defines a vertical centerline axis CL. Axis CL extends vertically through the geometric center of the housing and its internal cavity. The housing is configured for mounting on a substantially horizontal support surface S such as the ground, a concrete foundation or slab, support platform, etc. Housing 102 may therefore include a plurality of structural support legs 102*a* configured for mounting to and/or resting on the support surface. The legs elevate the housing above the support surface by a preselected distance.

Housing 102 may be generally cylindrical in shape comprising an upper roof 102*c* and vertically oriented circumferential sidewalls 102*b* extending downwards therefrom which collectively define an exterior of the housing. The housing further comprises an internal vertical divisional wall 124 spaced radially inwards from the sidewalls 102*b* within internal space 103 of the housing. Divisional wall 124 may be cylindrical and forms an interior peripheral annular space 124*a* within internal cavity 103 in which the rotating inner and outer radial collecting walls 121, 123 are disposed (see, e.g., FIGS. 10 and 12). The division wall is fixedly attached to housing 102 and remains stationary.

Housing 102 is preferably formed of a suitably strong metal or combination of metals such as steel, aluminum, etc. In one embodiment, steel may be used. As a non-limiting example size, housing 102 may be about 40 feet in diameter for a 100,000 CFM (cubic feet/minute) WESP gas treatment unit. Sizes and gas flows may of course vary depending on the application requirements.

The present WESP unit further includes a collection hopper 104, top gas outlet 110, and bottom gas inlet 111. The gas inlet and outlet are in direct or indirect fluid communication with the internal space 103 of the WESP. The gas inlet introduces the "dirty" process gas stream into the housing 102 and gas outlet discharges the treated "cleaned" process gas to atmosphere following particle removal. Gas outlet 110 and inlet 111 may be formed by short stub sections of ducts or piping in one embodiment which are fixedly coupled to the WESP housing. Gas outlet 110 may be vertically oriented and gas inlet 111 horizontally oriented in one embodiment. Gas inlet 111 is configured for coupling to an upstream gas conduit 111*a* (represented schematically by dashed lines) which may be formed by ducts or piping. Gas outlet 110 similarly is configured for coupling to a downstream gas conduit 110*a* (represented schematically by dashed lines) formed by ducts or piping.

The internal space 103 of WESP housing 102 may further include a horizontal lower partition wall 114 and a horizontal upper partition wall 115 vertically spaced apart therefrom. Lower partition wall 114 separates the bottom collection hopper 104 from portions of internal space 103 above which contains the primary and secondary collectors 120, 200. Both partition walls are fixedly coupled to housing 102 and may be formed of a suitable metallic structure such as steel plates or other.

As noted elsewhere herein, the process gas makes multiple turns or changes in direction as it flows through internal space 103 of the WESP housing 102. In doing so, the gas is slowing down in velocity with each change in direction as it moves from the gas concentrator center tube or pipe 113 (further described herein), into internal space 103, to the primary collector 120, and finally secondary collector 200. Since the gas is saturated and has entrained droplets of water, some water will naturally carry over from the process and can drop out at any location along gas flow path P (see, e.g., FIG. 9). In addition, the electrical field in the primary collector 120 will collect all the remaining droplets in the first vertical foot or so as these are very easy for the electrostatics to remove. This water needs a place and pathway to drain which is provided by drainage hole(s) 107 formed in horizontal lower partition wall 114 and associated downcomer(s) 107A further described herein.

In the same way, any condensed water that forms in the second treatment stage (secondary collector 200) can drain from horizontal upper partition wall 115 to the sump 104*e* in hopper 104 through drainage hole(s) and associated downcomer(s) 107A. So as described, the drainage holes and associated downcomers 107A act to remove and drain excess water droplets that carry over from the quencher 117 when the incoming gas stream is saturated and condenses on exposed surfaces within the gas flow path P through the WESP 101 rather than any collector surface wash water if used to clean the primary and/or secondary capacitors 120, 200.

Primary collector 120 is designed to remove a majority of particulate or particles entrained in the gas stream may be disposed within the internal space of WESP 101. The primary collector in one non-limiting embodiment comprises a pair of concentrically arranged and nested circular cylindrical metallic shells which respectively define circumferentially-extending inner radial collecting wall 121 and outer radial collecting wall 123. The shells may be formed of steel in one embodiment; however, other suitable electrically conductive and durable metals may be used. The collecting walls 121, 123 may be about 10 feet high in some embodiments as a non-limiting example. The outer radial collecting wall 123 may have a diameter D2 of about 40 feet as a non-limiting example. Other suitable heights and diameters may be used depending on the application requirements and conditions.

The radial collecting walls 121, 123 are arranged in radial spaced apart relationship from vertical centerline axis CL and collectively define a particulate collection annulus 122 therebetween configured to receive the flowing gas stream therethrough for separating and collecting particles from the stream when electrically charged. The inner radial collecting wall 121 concentrically nested inside the outer radial collecting wall 123 may be parallel thereto in one embodiment. In one non-limiting example, without limitation, the collecting annulus 122 may be about 30 inches wide (measured radially). Other suitable widths may be used.

The collecting walls 121, 123 are coaxially aligned with vertical centerline axis CL of WESP 101 and may be vertically oriented in the illustrated embodiment such that the cylindrical walls extend vertically for a suitable length. The concentric central openings at the top and bottom ends of each cylindrical radial collecting walls 121, 123 respectively are upwardly and downwardly open such that the gas flows vertically within and through the collection annulus 122 either upward or downwards. In one embodiment, the gas stream may flow upwards through collection annulus 122. In some embodiments, the vertical length of the inner radial collecting wall 121 may be coextensive with the vertical length of the outer radial collecting wall 123 so that each portion of one collecting wall has a corresponding opposite portion on the other collecting wall for uniformly removing particulate from the gas stream as it flows through the collection annulus 122.

Inner and outer radial collecting walls 121, 123 each define a respective arcuately curved collecting surface 121*c* and 123*c* respectively. The opposing collecting surfaces each face inwards towards collection annulus 122 between the walls 121, 123 and extend circumferentially around the entirety of the collection annulus. Collecting surfaces 121*c*, 123*c* have a suitable corresponding surface area designed to accommodate the flowrate of gas through the collection annulus 122 and collect particulate removed from the gas stream until it can be mechanically dislodged therefrom. Accordingly, the diameters D1 and D2 of the inner and outer cylindrical collecting walls 121, 123 and collecting surfaces 121*c*. 123 thereon may be selected to provided the desired corresponding surface area for this purpose. It is well within the ambit of those skilled in the art to make such a determination. It bears noting that the radial distance between the collecting walls 121, 123 is less than the diameters D1 or D2 of the collecting walls.

The inner and outer radial collecting walls 121, 123 are rotatable about a common rotational axis RA provided by a rotary drive mechanism 130 mechanically coupled to each of the walls. Rotational axis RA is coaxial and coincides with the vertical centerline axis CL of the outer housing 102 of the WESP 101 in one construction. In one embodiment, the inner and outer radial collecting walls 121, 123 may be rotated in unison at the same rotational speed by the rotary drive mechanism. In other embodiments, different rotational speeds may be used for each wall.

Figure 17:
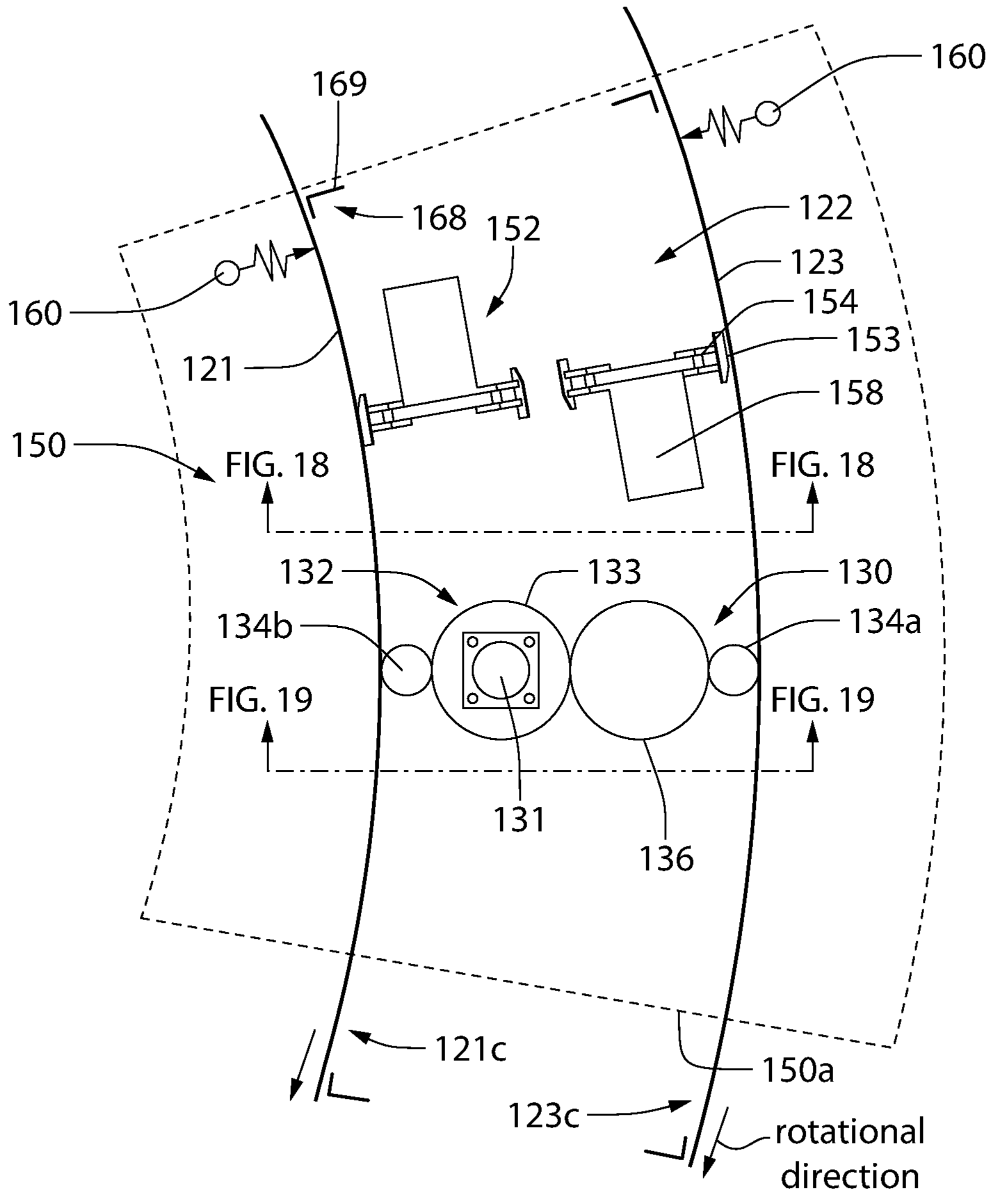
FIG. 17 is a top view of the cleaning station showing the drag chain conveyor-scraper assemblies, and rotary drive mechanism.
Figure 18:
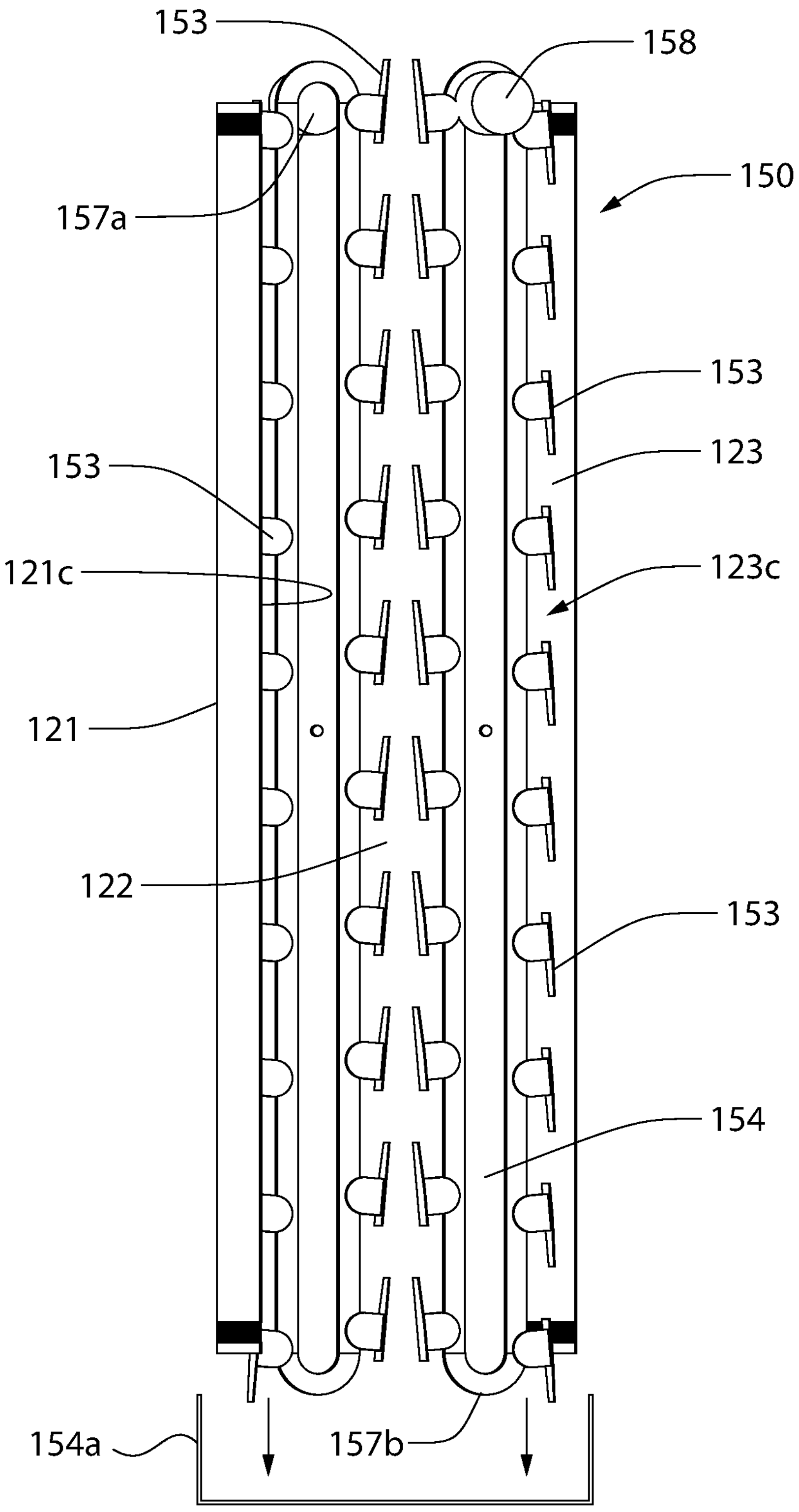
FIG. 18 is a side view of the cleaning station showing the drag chain conveyor-scraper assemblies and associated drive mechanisms.
Figure 19:
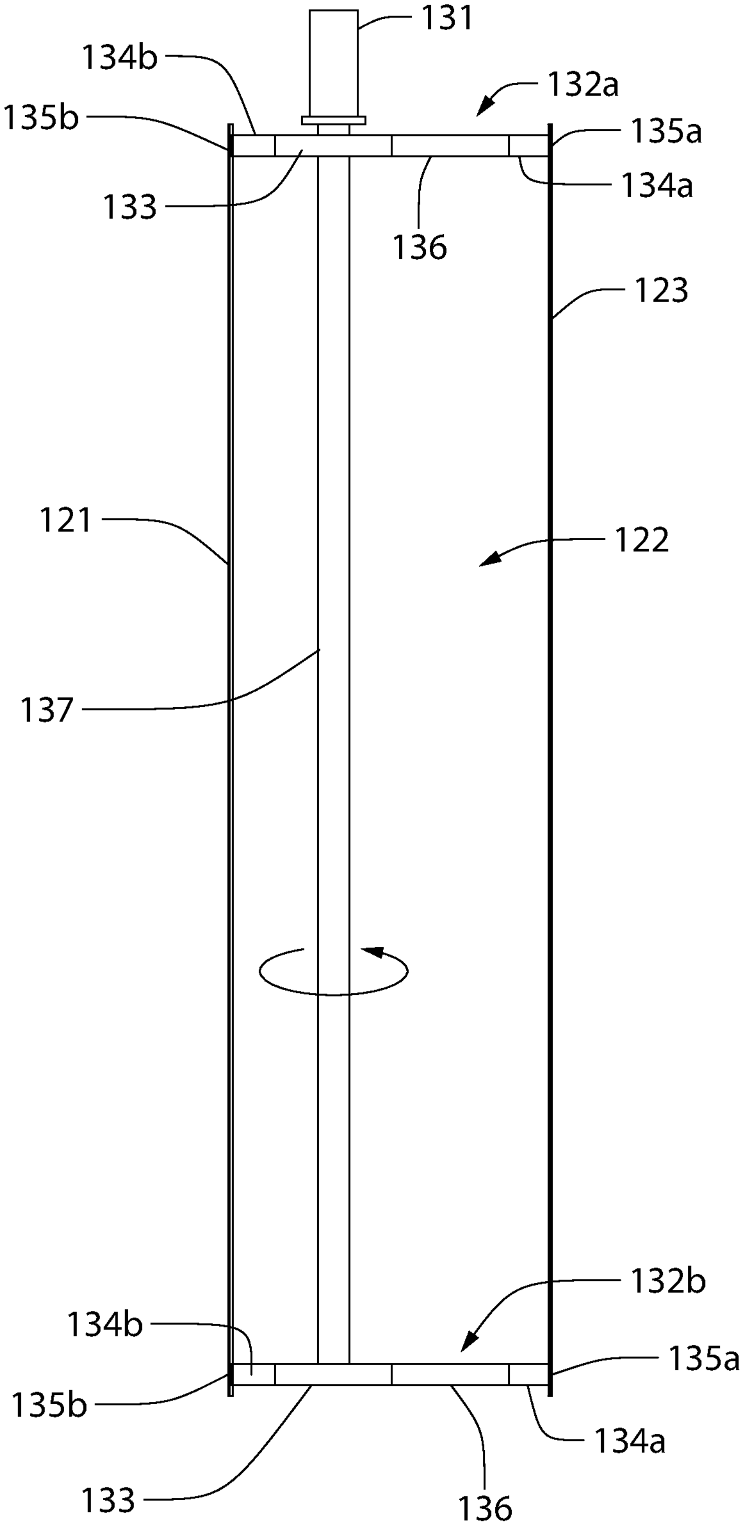
FIG. 19 is side view of the cleaning station showing the collecting wall rotary drive mechanism.

Referring to FIGS. 16, 17, and 19, the rotary drive mechanism 130 in one embodiment includes a suitable commercially-available electric drive motor 131 of sufficient power coupled to at least one gear train 132 configured to operably couple the drive shaft of the motor to each of the inner and outer radial collecting walls 121, 123 for rotation. In one embodiment, spur gears may be used. Although a single gear train 132 may be used to rotate collecting walls 121, 123, a pair of gear trains may also be used as further described herein—one each at the top and bottom ends of each wall and operably coupled to motor 131 if of sufficient power (e.g., horsepower). In other possible embodiments, each gear train may be powered by its dedicated motor if required.

The drive mechanism 130 in some embodiments can be located at least partially inside the cleaning compartment 150*a* which is fluidly isolated from the process gas flowing through WESP 101 and collection annulus 122 between inner and outer radial collecting walls 121, 123. In one embodiment, this may be achieved by providing narrow air gap seals 168 extending along the full height of the collecting walls at the entrance and exit from the stationary cleaning compartment 150*a*. Gap seals may be provided in one example by use of stationary structural seal members 169 such as angles fixedly coupled to portions of WESP housing 102. The pressurized process gas flowing through WESP 101 will seek the path of least resistance to which is to flow through the substantially wider collection annulus 122 between collecting walls 121, 123 rather than through the narrow gaps formed by the gap seals 168. Other types of seals including elastomeric or others may be used to minimize the amount of process gas which can leak into the cleaning compartment 150*a*. It bears noting that some relatively minor leakage into the compartment may be acceptable.

The collecting walls 121, 123 can move independently, and even different speeds (RPH—revolutions per hour) if required via configuration of the rotary drive mechanism 130. In one embodiment, for example, inner radial collecting wall 121 may rotate at a first speed while the outer radial collecting wall 123 may rotate at a different second speed (slower or faster). This may be used if one collecting wall is collecting particulate matter at a greater rate and quantity the other, thereby requiring more frequent passes through the cleaning station 150 since accumulations of particulate on the collecting walls gradually diminishes the electrostatic attraction of particles in the gas stream onto the collecting surfaces. Collecting walls speeds under 5 RPH, or even under 1 RPH depending on the diameter of the walls 121, 123 may be used as some non-limiting representative examples.

In other embodiments, however, the rotational speeds of the inner and outer radial collecting walls 121, 123 may be the same such that the walls rotate in unison. The gear train 132 may be appropriately configured to produce the desired speed and rotation of the inner and outer radial collecting walls 121, 123 in any of the above rotary wall drive operating scenarios. It is well within the ambit of those skilled in the art to achieve the desired rotary drive configuration for any of the above operating modes without undue elaboration.

Drive motor 131 and gear train 132 of rotary drive mechanism 130 may be configured and operable to rotate both collecting walls 121, 123 in the same direction in one embodiment. In the non-limiting illustrated embodiment, the rotary drive mechanism includes an upper gear train 132*a* including an upper drive gear 133 coupled to the drive motor 131 shaft, outer wall driven gear 134*a* coupled to drive gear 133 and circumferentially-extending gear track 135*a* disposed on the outer radial collecting wall 123, and inner wall driven gear 134*b* coupled to circumferentially-extending gear track 135*b* disposed on the inner radial collecting wall 121 and drive gear 133 via an intermediate idler gear 136. Rotation of the single drive gear 133 via motor 131 drives and rotates both the inner and outer collecting walls 121, 123. The drive, driven, and idler gears may be spur type gears in one embodiment as previously noted; however, other type gears may be used.

In one embodiment, gear tracks 135*a*, 135*b* may economically be formed by a plurality of circumferentially-extending and spaced apart gear engagement openings 135*c* formed through and around the entirety of the top and bottom ends of the collecting walls 121, 123 as best shown in FIG. 16. The openings 135*c* may be rectangular shaped in one embodiment to engage the teeth of the spur gears. In other possible embodiments, gear tracks 135*a*, 135*b* may instead comprises separate circular toothed track segments fixedly attached to the top and bottom ends of collecting walls 121, 123 such as via welding or another method.

To provide a more positive rotary drive, the collecting walls 121, 123 may be driven at both their top and bottom ends when dictated by the height of the walls which may reach 10 feet tall or more in some cases. Accordingly, in some embodiments a gear track 135*a* and 135*b* may be disposed adjacent to both the top and bottom ends of each wall (see, e.g., FIGS. 16A-B). A vertical drive shaft 137 coupled to motor 131 at top may be provided which extends downwards for substantially the full height of collecting walls 121, 123 within the collection annulus 122. The bottom end of drive shaft 137 is operably coupled to a second lower gear train 132*b* having the same gearing components and configuration as upper gear train 132*a* previously described herein. The bottom end of the drive shaft is coupled to a second drive gear 133 which operates the lower gear train. The lower gear train includes the same components as upper gear train and will not be repeated here for the sake of brevity, but is shown for example in FIG. 19.

Other types of rotary drive mechanisms, gears, arrangements, and gearless drives may be used in other embodiments which are configured and operable to rotate the inner and outer radial collecting walls 121, 123.

The electrical system of WESP 101 will now be briefly described. With continuing reference to FIGS. 1-19 in general, at least one electrode 140 may be disposed between the collecting walls 121, 123 within the collection annulus 122 of the primary collector 120. In preferred but non-limiting embodiments, a plurality of circumferentially spaced apart electrodes are disposed in the collection annulus. Electrodes 140 may be evenly spaced circumferentially and equidistant between inner and outer radial collecting walls 121, 123 to emit a uniform electric corona to charge particles entrained in the gas stream flowing through collection annulus 122.

In one embodiment, the emitting electrodes 140 may be suspended in the collection annulus 122 of the primary collector 120 from above by high voltage frame 105 supported in turn by high voltage insulators 106 mounted to the outer housing 102. The energized frame 105 is electrically isolated from the main outer housing 102 of the WESP 101 by the insulators. In one embodiment, the same high voltage frame 105 may be configured to energize both electrodes 140 of primary collector 120 and electrode plates 202 of the secondary collector, which is further described elsewhere herein.

Figure 8:
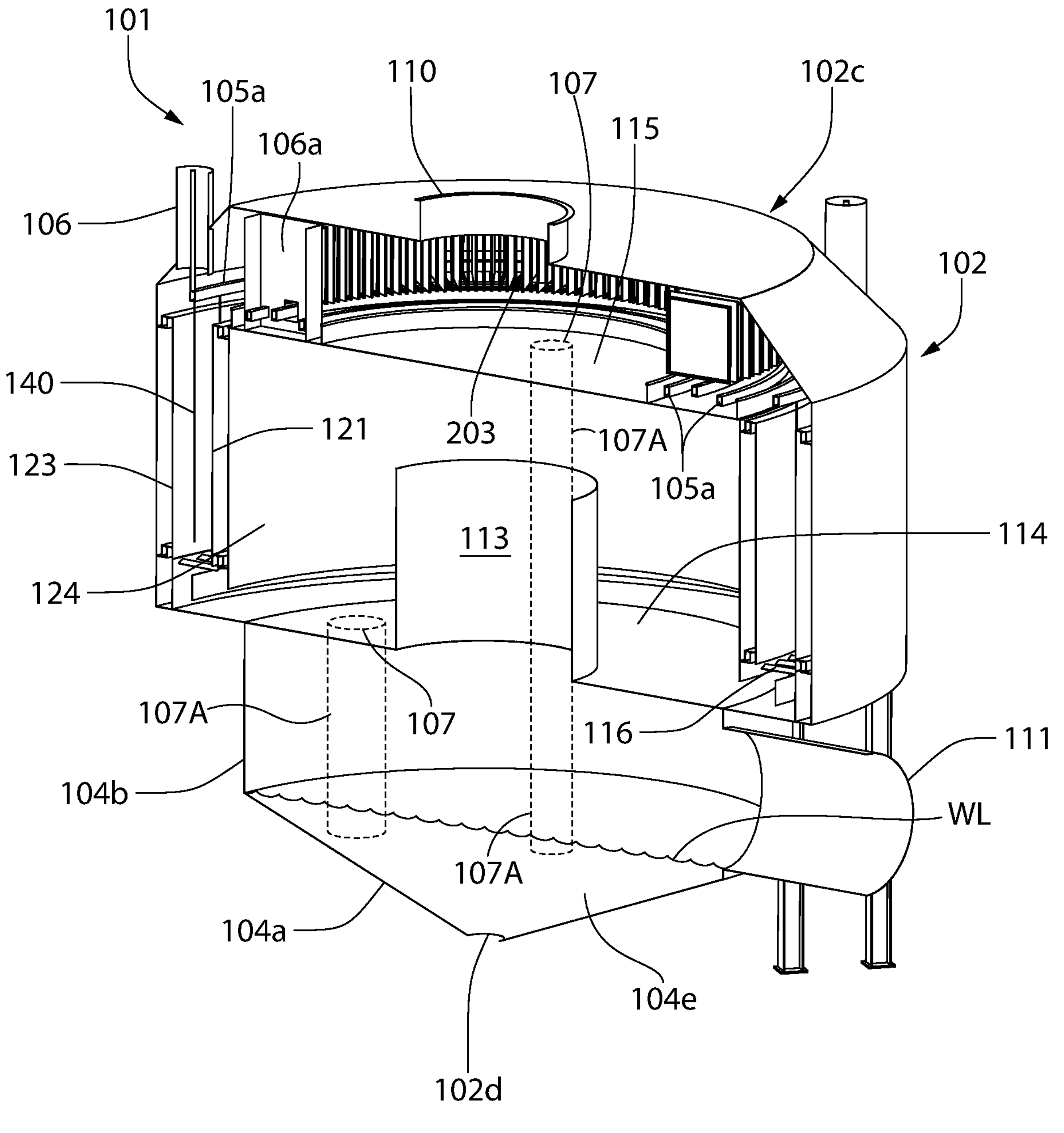
FIG. 8 is a side cross-sectional perspective view thereof.

To accomplish the above functionality, high voltage frame 105 may be comprised of multiple electrically-conductive metallic members such as support rings 105*a* which are energized via coupling of the frame to an external electrical source (see, e.g., FIG. 8). Rings 105*a* may be tubular in shape in some embodiments. The rings may be concentrically arranged relative to each other and coaxial with vertical centerline axis CL of WESP 101. One outermost ring 105*a* may be disposed at the top of collection annulus 122 which provides for attachment of the vertical rod-like electrodes 140 thereto between collecting walls 121, 123. Electrodes 140 are vertically suspended from the rods. One or more energized innermost rings 105*a* may be nested inside the outermost ring to support and provide power to the energized electrode plates 202 of the secondary collector 200 further described herein. The collector plates 210 of the secondary collector are electrically insulated from these innermost rings. The innermost and outermost rings 105*a* may be radially spaced apart as shown.

As one example, the high voltage frame 105 may be charged to 100 kV (100,000 volts) for some applications to handle "sticky" particulate matter. The electrodes 140 may be formed by hollow tubes or solid rods of any suitable cross-sectional shape (e.g., circular, square, or other) and have a vertical height which extends for a majority of the height of the collecting walls 121, 123 and collecting surfaces 121*c*, 123*c* within the collection annulus 122.

The energized support rings 105*a* of high voltage frame 105 may have a circular or annular shape that may be "substantially" continuous for 360 degrees except for a discontinuous segment or sector of fixed arc length which is cutout to accommodate the cleaning compartment 150*a* through which the collecting walls 121, 123 rotate through for particulate buildup removal, as further described herein. The high voltage frame 105 therefore does not extend through the cleaning compartment of the cleaning station 150.

In some embodiments, the secondary collector 200 and primary collector 120 may be powered from the same TR power supply which energizes the support rings 105*a* previously described herein. In other embodiments, however, each collector may have its own separate and dedicated power supply. In such a case, the secondary collector may include one or more separate high voltage insulator boxes 106A shown in FIG. 8.

In operation, the electrodes 140 of primary collector 120 emit a corona which electrically charges particles in the gas stream, which is wetted in the case of WESP 101. The charge may be negative in some cases. The charged particles are electrostatically attracted to collecting surfaces 121*c*, 123*c* of the inner and outer radial collecting walls 121, 123 which are electrically grounded. The collecting surfaces retain the charged particles until dislodged and removed at the cleaning station 150 of the primary collector 120 by one or more cleaning devices 151.

In certain embodiments, the cleaning devices 150 may be supplemented and aided in some instances if needed by use of a cleaning fluid such as steam or water to soften and loosen the particle deposits depending on the type and nature of the particles. This may be required for particulate of a sticky nature. Liquid chemical solvents may also be used in some instances in conjunction with water if needed to loosen the particle deposits. For example, solutions of an appropriate chemical and water may be prepared and applied (e.g., sprayed) onto the collecting surfaces 121*c*, 123*c* to wash down the inner and outer radial collecting walls 121, 123 for such purposes.

It bears special noting however that the particle deposits built up on the collecting surfaces 121*c*, 123*c* of collecting walls 121, 123 are substantially and primarily removed therefrom for the most part via mechanical force applied by the cleaning device 150. This advantageously eliminates or at least minimizes the need for water washing or solutions creating resultant polluted wastewater which must then be specially handled and eventually treated to meet applicable environmental wastewater discharge limits for total suspended solids, pH, toxic metals, etc.

The cleaning station 150 is located at one fixed circumferential position of the cylindrical housing 102 of WESP 101. The rotating inner and outer radial collecting walls 121, 123 pass through the cleaning station with each full rotation or revolution in order to at least mechanically clean and remove the particulate matter accumulations electrostatically adhered to the collecting walls, as further described herein. Preferably, the collecting station is fluidly isolated from the electrostatic particle collection process via air gap seals described elsewhere herein so as to not interrupt the gas flow therethrough. This allows the WESP unit to continue operation while simultaneously removing particulate matter from the collecting wall.

To provide the foregoing functionality, the cleaning station comprises a metallic cleaning compartment 150*a* which is fluidly isolated from the industrial process gas stream. There are no electrodes 140 inside the compartment. Compartment 150*a* may be a box-like structure formed of an assemblage of commercially-available metallic structural shapes (i.e. angles, I-beams, plates, rods, tubes, etc.) such as steel and/or aluminum coupled together by any suitable mechanical method (e.g., welding, fasteners, adhesives, etc.) and supported directly and/or indirectly by housing 102. The cleaning compartment is stationary and occupies a segment or sector of fixed angular or arc length of the cylindrical WESP housing 102. As one example for a 40 foot diameter outer radial collecting wall 123, cleaning compartment 150*a* may have an angular or arc length of about 8 feet. Compartment 150*a* may extend for at least the full height of the inner and outer radial collecting walls 121, 123 which rotate into and through the compartment for cleaning the collecting surfaces 121*c*, 123*c* with each revolution.

Cleaning station 150 comprises at least one or preferably a pair of mechanical cleaning devices 151 disposed inside cleaning compartment 150*a*. The cleaning device or devices are configured and operable to apply a mechanical cleaning force to the collecting surfaces 121*c*, 123*c* as the collecting walls 121, 123 rotate through compartment 150*a*. Device(s) 151 operate to remove the particle deposits (particulate) collected and built up on the inner and outer radial cleaning wall surfaces 121*c*, 123*c* prior to them exiting the cleaning station.

In one embodiment, a pair of the cleaning devices 151 may be provided—one to separately clean each of the inner and outer radial collecting walls 121, 123 separately. The cleaning devices may each comprise a vertically oriented drag chain drive mechanism 152 including a plurality of scrapers 153 mounted to a circulating drag chain 154 disposed and operating inside cleaning compartment 150*a* at the cleaning station 150. The mechanism includes an upper sprocket 157*a* and lower sprocket 157*b* around which the chain 154 travels. One sprocket may be a drive sprocket coupled to an electric motor 158 and the other may be the driven sprocket. Either the upper or lower sprocket may be the drive sprocket and the remaining one the driven sprocket.

Drag chain 154 may be vertically oriented such that the scrapers 153 travel downwards between the collecting walls 121, 123 in collecting annulus 122 to scrape the particle deposits off the collecting wall surfaces 121*c*, 123*c* s in the downward direction. On the opposite or reverse side of the drag chain, the chain and scrapers travel upwards inside the annulus 122. Any suitable commercially-available metal chain of suitable structure may be used for the drag chain which allows coupling and mounting the scrapers thereto in a stable manner.

Scrapers 153 in one non-limiting embodiment may be formed of a suitable metal (e.g., steel or other) and are fixedly mounted in spaced apart relationship on the moving drag chain 154. The scrapers are configured to scrape and shear the particulate deposits off of the collecting walls 121, 123. In one embodiment, each scraper may generally L-shaped and can include an angled leading edge 153*a* sloped in the direction of rotational travel of the collecting walls 121, 123. Scrapers 153 with leading edges 153*a* are configured to direct the removed particle deposits towards a drop zone formed at the bottom of the collection annulus 122 and into the collection container 154*a* below for removal and disposal. Any number of suitable other scraper shapes may be used to scrape the particulate matter off the walls in a downward direction. In addition, non-metallic scrapers mounted to drag chain 154 such as those formed of an elastomeric material which may operate via squeegee and/or scraping action to remove the particulate matter from the collecting walls 121, 123 may be used in other embodiments. If used in a dry electrostatic precipitator, brushes may form the scraping or cleaning elements to strip the particulate matter off the collecting walls.

Figure 15:
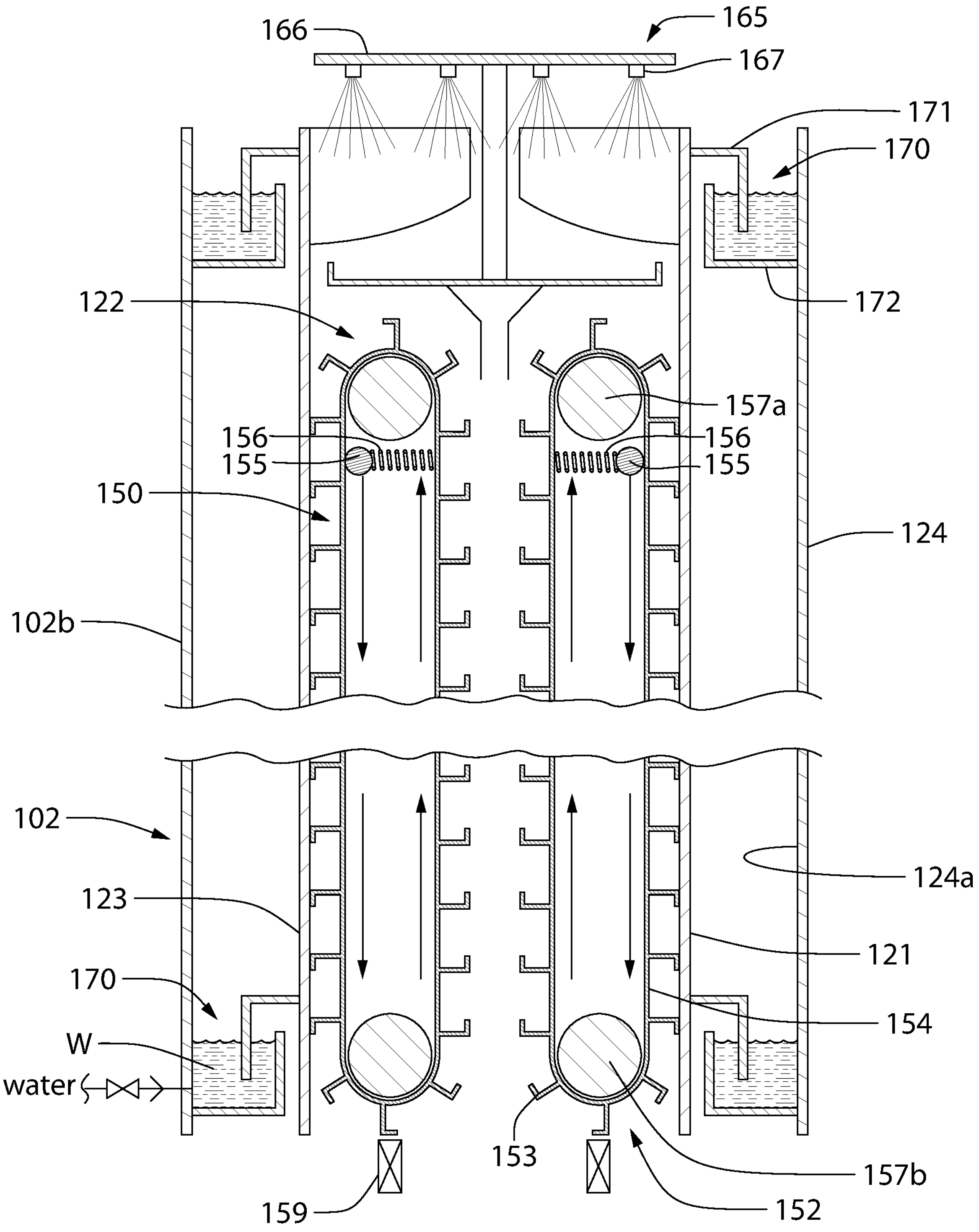
FIG. 15 is a schematic side cross-sectional view the cleaning station showing the drag chain conveyor-scraper assemblies and water seals.
Figure 16A:
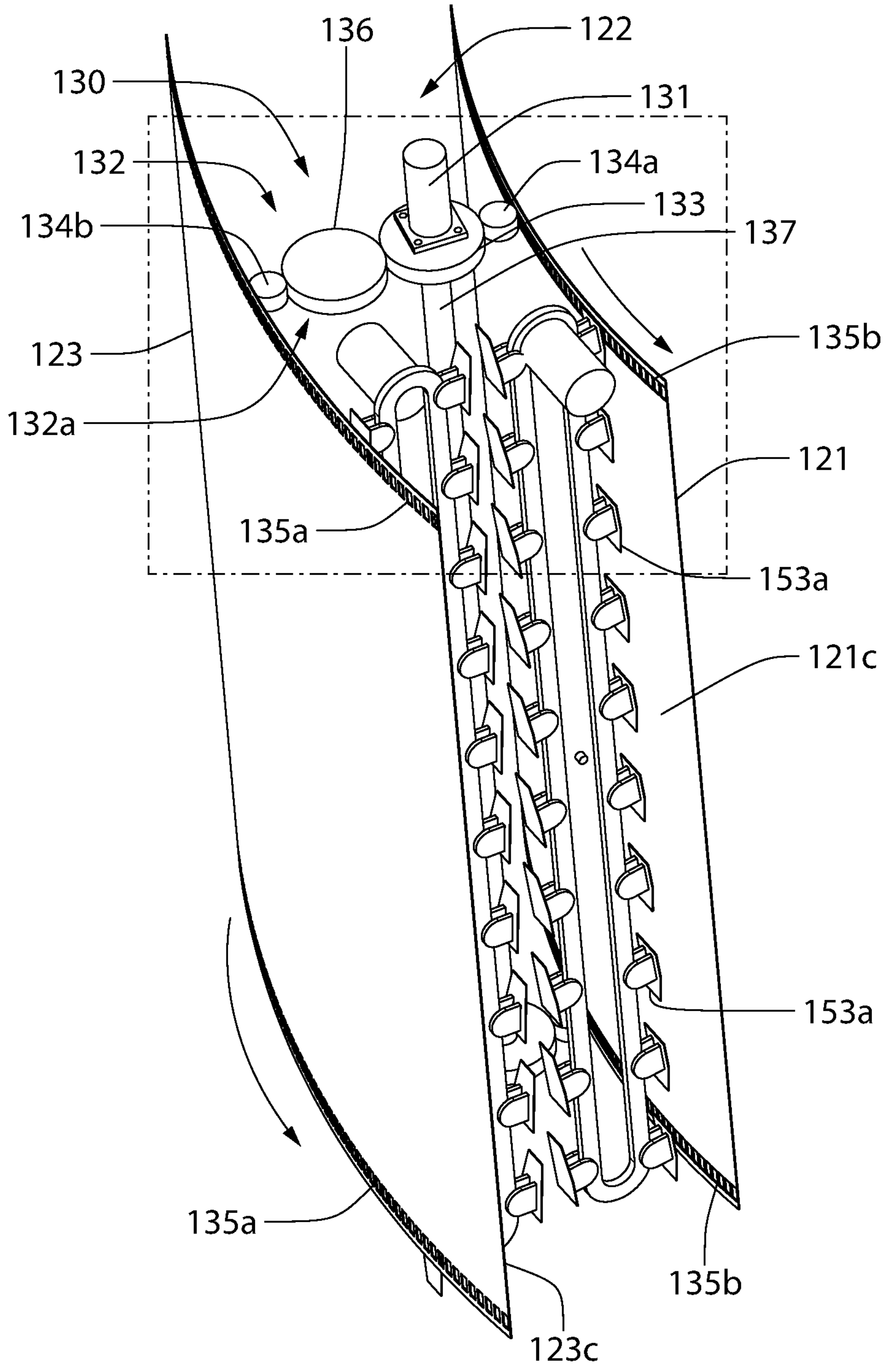
FIG. 16A is a cross-sectional perspective view with cutaway showing the cleaning station, drag chain conveyor-scraper assemblies, and rotary drive mechanism of the precipitator.
Figure 16B:
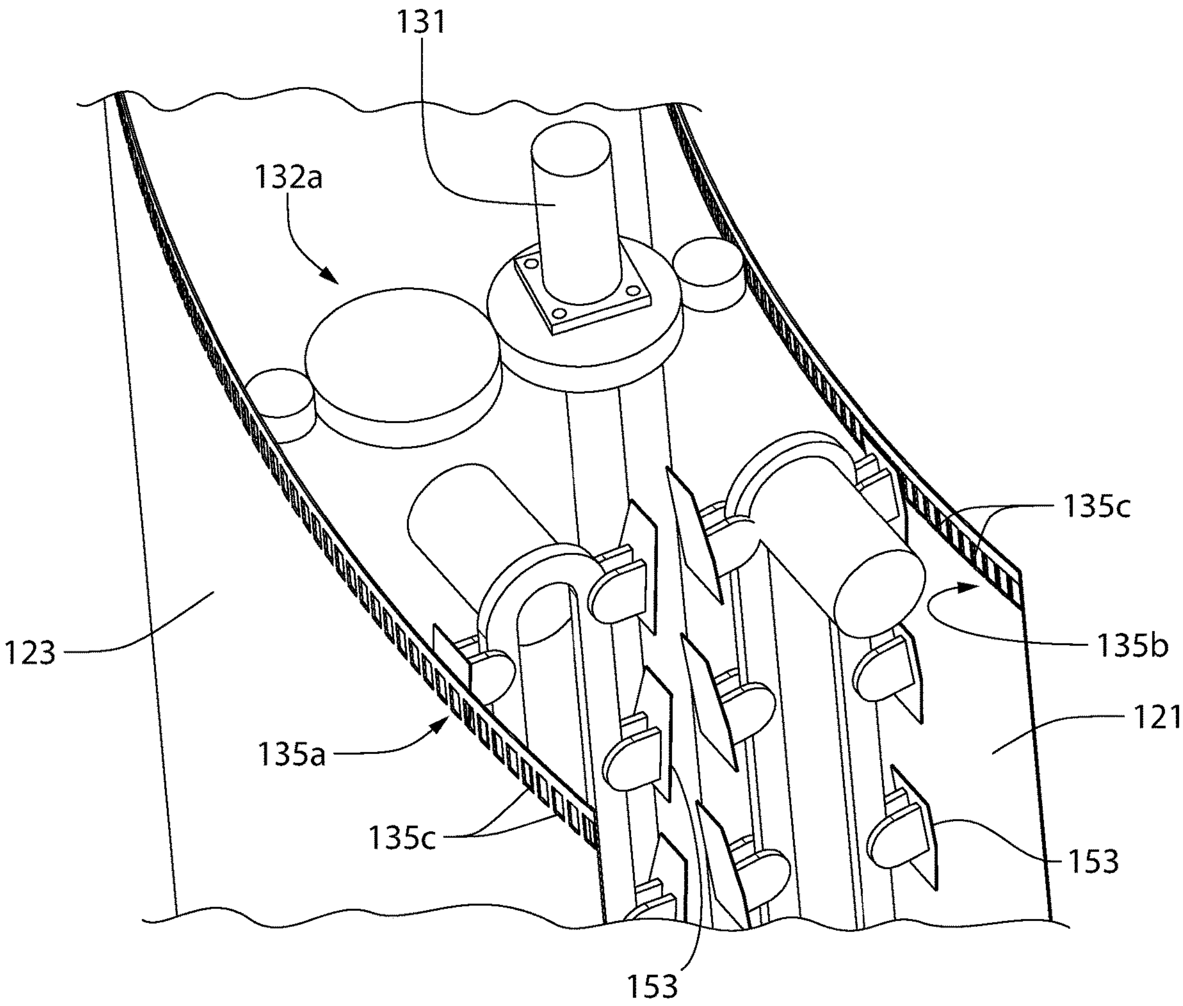
FIG. 16B is an enlarged detail taken from FIG. 16A.

A plurality of chain deflection apparatuses may be provided for each drag chain mechanism 152 to force the scrapers 143 into vertically downward sliding contact with the inner and outer radial collecting walls 121, 123 (see, e.g., FIG. 15). In one embodiment, each chain deflection apparatus may comprise a wheels or roller 155 which acts against the vertical side of the drag chain 154 opposite the side on which the scrapers 153 are mounted. The rollers may be vertically spaced apart and are each biased against the downward traveling side of the drag chain 154 by springs 156. The spring-biased rollers in turn force the chain towards collecting walls 121, 123 and keep the scrapers 153 in contact with the collecting surfaces 121*c* and 123*c* thereon. Although only two chain deflection apparatuses are shown (one for each drag chain) for brevity of illustration, in practice a plurality of vertically space apart apparatuses are provided to force the scrapers 153 into sliding engagement with collecting walls 121, 123.

In one embodiment, the scrapers 153 may exit the housing 102 of WESP 101 at the bottom after passing vertically along the entire collecting surfaces of the collecting walls 121, 123, from top to bottom and may be mechanically cleaned there if needed (outside the WESP internal space 103) before the return back for the trip to the top of the wall. Cleaning members 159 such as wipers and/or brushes may be provided near the bottom of the drag chain and configured to physically wipe or brush residual particles off the scrapers 153 as the drag chain 154 and scrapers continues to circulate and move upwards and downwards. The wipers if used may be formed of straight flat elastomeric or rubber blades that wipe the surface of the scrapers substantially clean.

The scrapers 143 preferably move in downward direction at a linear velocity or speed greater than the angular speed at which the collecting walls 121, 123 rotate. This ensures that all portions of the wall collecting surfaces 121*c*, 123*c* encounter at least one scraper 153 as the walls continue to rotate through the cleaning compartment 150*a* and are scraped clean before exiting. Because the scrapers 143 are vertically spaced apart, portions of the collecting surfaces might otherwise bypass the scrapers and not be cleaned if the walls rotate too quickly relative to the linear speed of the scrapers.

In operation, the "dirty" inner and outer radial collecting walls 121, 123 with particulate matter deposits thereon enter the cleaning compartment 150*a*. Each wall encounters scrapers 153 mounted to the pair of drag chains 154. The deposits are scraped off in the downward direction and fall into the collection container 154*a* in the "drop zone" below the chains.

It bears noting that both the rotary drive mechanism components and drag chain mechanisms may be supported directly or indirectly by the structure cleaning compartment 150*a* and housing 102, or a separate structural tower of sufficient height disposed inside the cleaning compartment. Any suitable means of structural support may therefore be provided for these mechanisms.

In some case depending at least in part on the type and nature of the particles, pre-conditioning of the collecting walls 121, 123 may be beneficial to facilitate removal of the particulate buildup/deposits. In one embodiment, the walls 121, 123 may be heated to in turn heat the buildup by about 10 to 20 degrees Fahrenheit to help soften the particulate for mechanical and optionally water washing off the walls. This can be accomplished in various ways including indirectly via the use of heaters 160 such as for example without limitation infrared heat lamps focused on the sides or back of the collecting walls opposite the collection annulus 122, or heating the backs of the walls (facing away from collection annulus 122) with hot air which in turn conducts the heat through the walls to soften the particulate deposits on the sides of the walls inside the collection annulus. Other heating methods may be used. Heaters 160 may be mounted inside cleaning compartment 150*a* before and ahead the scrapers 153 relative to the rotational direction of the travel of the collecting walls 121, 123. This softens the deposits before they encounter the scrapers. A plurality of heaters may be provided for each of the collecting walls in vertical spaced relation to heat the entire height of each wall.

As represented schematically in FIG. 15, a washing system 165 for the primary collector 200 may optionally be provided when need depending on the nature of the particles to be collected. The system may comprise a circumferentially-extending ring header 166 which supplies washing water to a plurality of spray nozzles 167 which spray water in a downward direction along the collecting wall surfaces 121*c*, 123*c* inside collection annulus 122 flush the particulate matter away. Ring header 166 may be mounted above the collecting walls 121, 123 as shown. The wash water with particulate therein drains downwards along walls 121, 123 and flows into a collection container 154*a* or other suitable receptacle below for removal and treatment (see, e.g., FIG. 18).

Secondary Collector

In some instances, the primary collector 120 may not be sufficient alone to remove all of the entrained particles from the gas stream necessary to meet the applicable air quality discharge standards for the cleaned gas stream. For example, the primary collector 120 may remove 90% or more of the particulate from the gas stream, but not 100% or at least enough to meet the applicable regulatory air emission limits. In such cases, a secondary collector 200 may be provided as a final trim or polishing collector to remove the remaining particles from the process gas prior to discharge to the atmosphere. Accordingly, the moving collecting walls 121, 123 may be followed by an array of plate style collectors which have alternating charged and grounded plates. This allows for varying the size and spacing of the secondary field collectors to suit the application. Since the primary stage will remove 90% or more of the mass of particulate in the incoming gas stream, the secondary field is used as a polishing step.

In one embodiment, secondary collector 200 may comprise a circular cassette 203 forming an annular or ring array of alternating electrically grounded collector plates 201 and energized electrode plates 202 spaced apart therebetween. Electrode plates 202 emit a corona and apply an electrical charge to the particles in the process gas which are attracted to and collect on the collector plates via electrostatic attraction forces. The gas stream is flowable through collection passages 204 formed between adjacent electrode and grounded plates. In one embodiment, the collector and electrode plates 201, 202 are arranged to allow process gas to flow in a horizontal radial direction through the secondary collector 200 between the plates.

Secondary collector cassette 203 may be disposed completely inside the WESP outer housing 102 above the radial collecting walls 121, 123 which extend peripherally around the inside of the housing and internal space 103. The cassette is centrally located relative to the collecting walls and coaxial with vertical centerline axis CL of the WESP unit such that gas flow leaving the collection annulus 122 flows radially inwards through and between the collector plates 201 and energized electrode plates 202. In one embodiment, cassette 203 may be a self-supporting structure which is liftable as a prefabricated unit into and mountable inside the WESP housing 102. In this design, the collector and electrode plates 201, 202 may be fixedly coupled to annular support rings 105*a* of high voltage frame 105 such as via welding, brackets, fasteners, combinations thereof, and/or other means.

In other possible embodiments contemplated, the secondary collector cassette with collector plates 201 and electrode plates 202 may be mounted on top of roof 102*c* of WESP outer housing 102 rather than inside the housing. This mounting scenario may be used where the size and associated treatment capacity of the secondary collector 200 needed might be too large and inconvenient to mount inside internal space 103 of the primary collector 120. In other possible embodiments, it bears noting that other configurations and types of secondary collectors may be used instead of the annular array of collector plates 201 and electrode plates 202.

The secondary collector plates 201, 202 may be cleaned either by dry methods or wet water washing. The removed particulate matter whether dry or entrained in wash water is externally routed and discharged from the WESP 101 to a separate tank (not shown), and therefore is not captured in the bottom collection hopper 104 disclosed herein.

Bottom collection hopper 104 of WESP 101 is provided to collect excess quench water drainage from quencher 117 and water condensed out of the gas stream (condensables) on surfaces inside WESP 101 as further described elsewhere herein. The hopper 104 in the present embodiment is therefore not used to collect wash water if used to clean particulate matter deposits off collecting surfaces of either the primary or secondary collectors 120, 200.

Hopper 104 is disposed beneath outer housing 102 of primary collector 120. In one embodiment, the hopper may be coupled to and supported in a suspended manner from the bottom of the outer housing 102 of the WESP 101 as shown in the illustrated embodiment. Hopper 104 may include an upper cylindrical sidewall 104*b* and conical bottom 104*a* terminated at the bottom by a drainage outlet 102*d* which receives overflow pipe 104*c* therethrough as further described herein. Pipe 104*c* is sealed to drainage outlet 104*d* (e.g., seal welded or gasketed) to form a leak tight seal. The angled or sloping walls of conical bottom 104*a* (relative to vertical centerline axis CL) converge in the downwards direction towards the outlet 104*d* as shown. Hopper 104 and its related appurtenances such as the partition walls may be formed a metal suitable for the intended service, such as steel or other metals.

Figure 9:
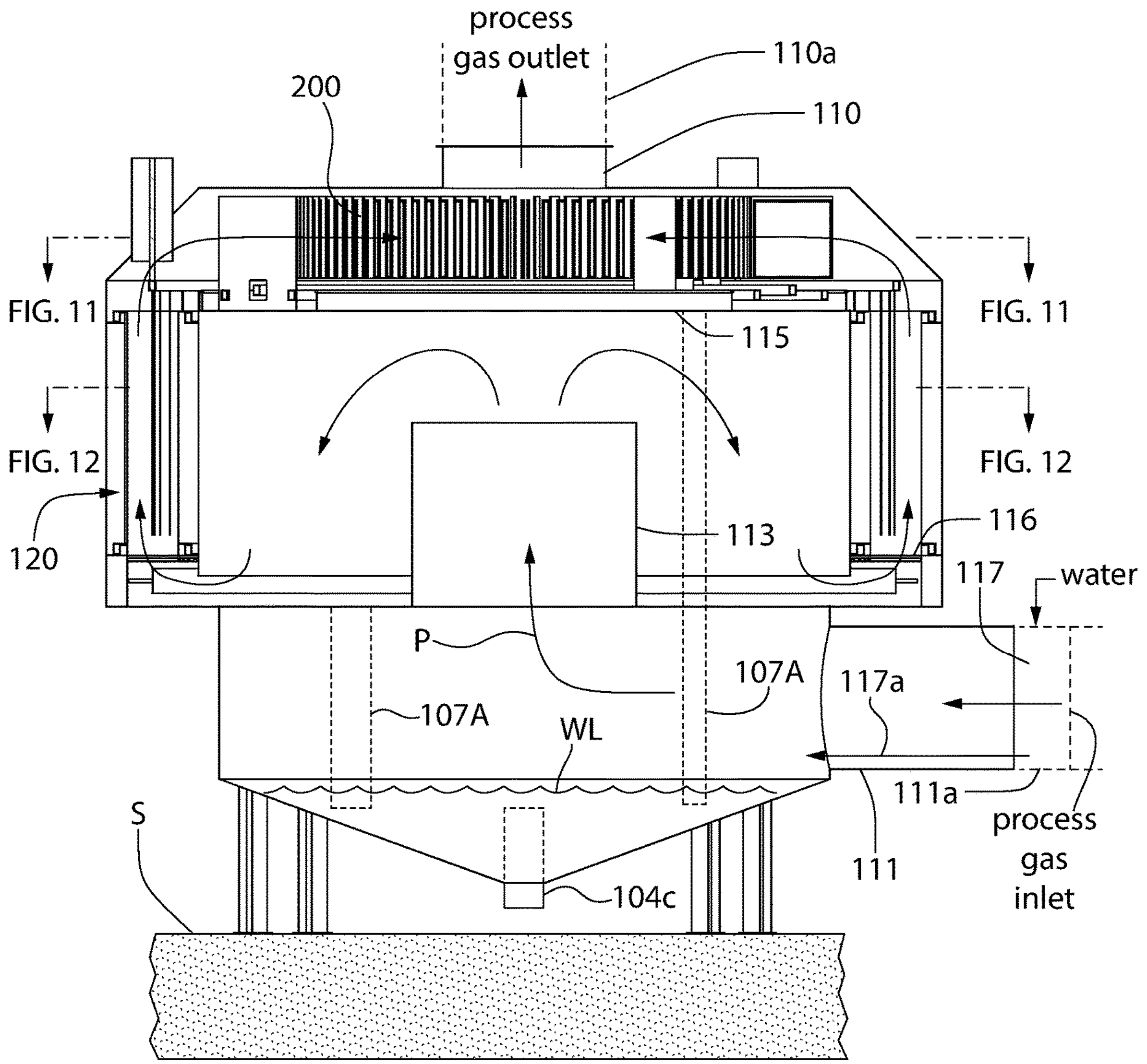
FIG. 9 is another side cross-sectional view thereof showing the process gas flow path through the precipitator.

In one embodiment, with particular reference to FIGS. 8 and 9, conical section 104*a* of collection hopper 104 defines a sump 104*e* which contains an inventory of water and maintains a constant water level WL within the collection hopper. The hopper sump continuously captures drainage from the quencher 117 whose spray nozzles inject quench water into the incoming process gas just upstream of the WESP unit. The quantity of water sprayed is intentionally more than necessary to ensure that the incoming gas stream is fully saturated for treatment in the WESP 101. Accordingly, an overage or excess volume/amount of water continuously collects at the bottom of the quencher unit and flows/along the bottom of the gas inlet 111 duct towards and into sump 104*e* (see, e.g., FIG. 9 drainage flow path 117*a*). Gas inlet 111 is therefore preferably sloped towards the sump and hopper 104 to positively direct the drainage thereto via gravity.

The maximum water level WL in sump 104*e* may preferably be maintained at a height not exceeding the bottom of the gas inlet 111 via provision of a suitable water level controls. This prevents unduly occluding the gas inlet 111 which remains wide open to receive the incoming process gas for treatment in WESP 101 without causing additional pressure drop in the gas stream. In one embodiment, water level WL may be maintained by overflow pipe 104*c* which has an external lower portion that extends below hopper 104 and an internal upper portion which projects upwards into sump 104*e* as shown (see, e.g., FIG. 9). The open top end of the overflow pipe intakes water from the sump to automatically maintain the water level without need for more complex electronic or other level control devices/systems. In other embodiments, however, electronic water level sensors and a control system including a valve could be used to provide an alternative means for controlling the water level if needed and/or desired.

Drainage holes 107 in partition walls 114 and 115 may each be coupled to a separate tubular downcomer 107A (e.g., tube or pipe section) which extends downwards into the sump 104*e* below the water level WL. The downcomers prevent ingress of the incoming process gas entering collection hopper 104 through the drainage holes 107 in a manner which would bypass the normal circuitous gas flow path shown in FIG. 9 and further described herein. Downcomers 107 fluidly coupled to drainage holes 107 in the upper partition plate 115 extend through lower partition plate 114 into sump 104*e*. The downcomers fluidly coupled to drainage holes 107 in the lower partition plate extends directly into the sump. For either downcomers 107*a*, the open bottom ends terminate below the normal water level WL to prevent process gas leaking upwards through the downcomers and partition plates 114, 115. Downcomers 107A may be vertically elongated and oriented in one embodiment as shown and extend downwards through internal space 103 of WESP housing 102. Other downcomer configurations may be used.

According to another aspect of the invention, housing 102 of WESP 101 may be configured to form a circuitous inlet gas flow path P shown in FIG. 9 to initially remove heavy particles and quenching water droplets entrained in the process gas via gravity before encountering the primary collector 120 rotating collecting walls 121, 123 disposed inside the periphery of the WESP outer housing 102. The circuitous non-linear gas flow path and change in direction of the flow slows the gas velocity to promotes fallout of the heavier particles and water droplets.

Process gas first flows through a quencher 117 upstream of WESP 101 which comprises flow nozzles which spray water into and wet the gas stream. Quencher 117 may be located proximate to WESP 101 in one embodiment as shown or further upstream.

The wetted gas stream then enters collection hopper 104 of WESP 101 in a horizontal and radial inward direction through gas inlet 111 (as indicated by the directional gas flow arrows of gas path P shown). The gas stream reaches the center of the housing and then changes to a vertical direction entering internal space 103 through vertically oriented tubular gas concentrator tube or pipe 113. This represents a first change in direction of the incoming process gas flow to WESP 101 that causes larger particles to drop out of suspension from the gas stream and collect in the hopper 104 below. Concentrator pipe 113 be a circular and hollow cylindrical structure as shown in one embodiment which protrudes upwards into the internal space 103; however, other tubular shaped concentrators may be used. The gas concentrator pipe may be centrally located relative to WESP outer housing 102 and may be fixedly coupled to and penetrates horizontal lower partition wall 114 which extends across the bottom of internal space 103 within the housing. Partition wall 114 defines a corresponding central opening 114*a* which allows the gas to enter the concentrator pipe.

After the process gas enters internal space 103 from gas concentrator pipe 113, a second change in gas flow direction occurs when the gas flow impinges the bottom of horizontal upper partition wall 115. Partition wall 115 disperses and spreads the more collimated gas stream leaving gas concentrator pipe 113 radially outwards 360 degrees to all peripheral regions of the WESP internal space 103. Partition wall 115 may be parallel to lower partition wall 114 in one embodiment and each may be substantially flat. Other configurations of partition walls may be used.

The gas flow then turns downwards towards the lower peripheral region of the WESP internal space 103 (third change in direction) and radially outwards (fourth change in direction) to the bottom entrance of the collection annulus 122 between inner and outer radial collecting walls 121, 123. The gas enters the annulus at bottom and flows vertically upwards therethrough (fifth change in direction). The gas may flow through a plurality of radial flow baffles 116 disposed at the bottom the annulus 122. Baffles 116 are spaced apart and extend circumferentially around the entire bottom of the collection annulus. Flow openings formed between adjacent spaced baffles allow the gas to enter the annulus.

After the primary collector 120 removes a majority of the particles from the process gas stream (e.g. 90% or more in some embodiment), the gas leaves the collection annulus 122 at top and next turns back radially inwards towards the vertical centerline axis CL of the WESP 101 (sixth change in direction) through secondary collector 200. The gas flows radially and horizontally through and between the collector plates 201 and electrode plates 202 previously described herein towards gas outlet 110. When reaching the center of the WESP 101, the gas abruptly turns vertically upwards (seventh change in direction) and exits the WESP from the top gas outlet 110 to atmosphere either directly or via downstream gas conduits 110*a* (represented schematically by dashed lines).

In sum, the foregoing multiple change in direction of the process gas along gas flow path P through internal space 103 of WESP 101 causes the gas to change vertical direction twice and horizontal/radial direction twice.

Figure 10:
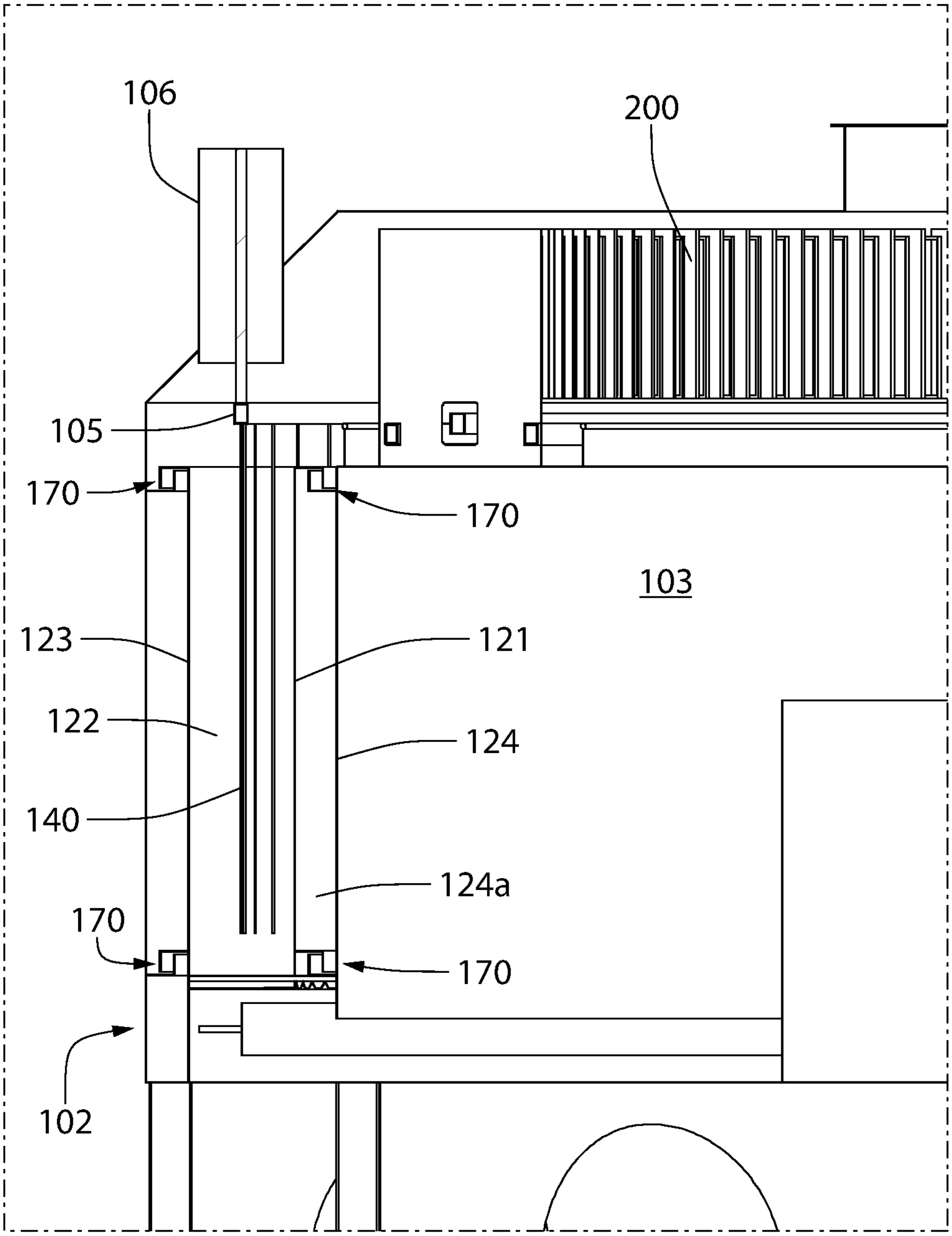
FIG. 10 is an enlarged view from FIG. 7.
Figure 11:
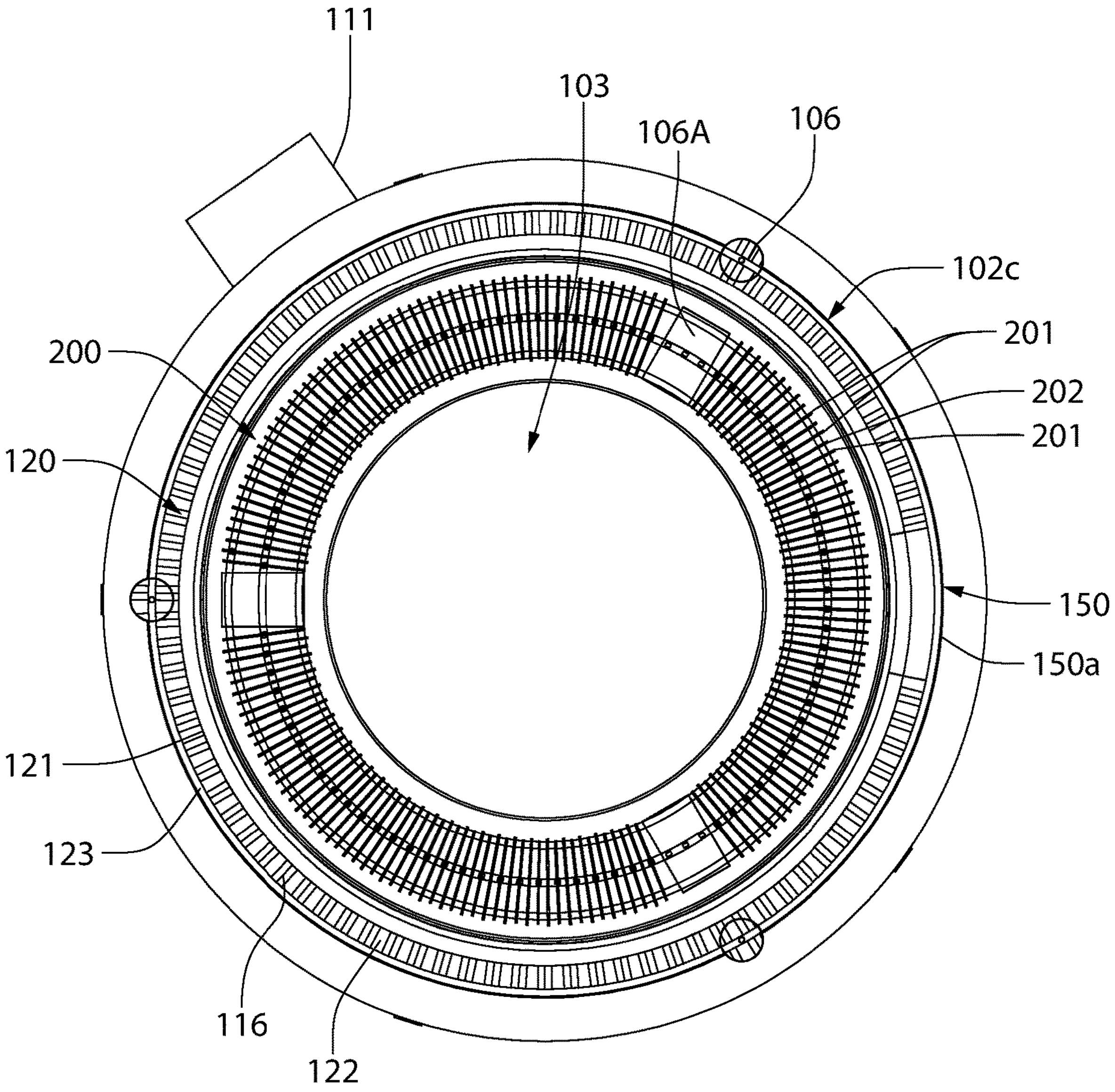
FIG. 11 is a first transverse cross sectional view taken through the secondary collector of the precipitator as indicated in FIG. 9.
Figure 12:
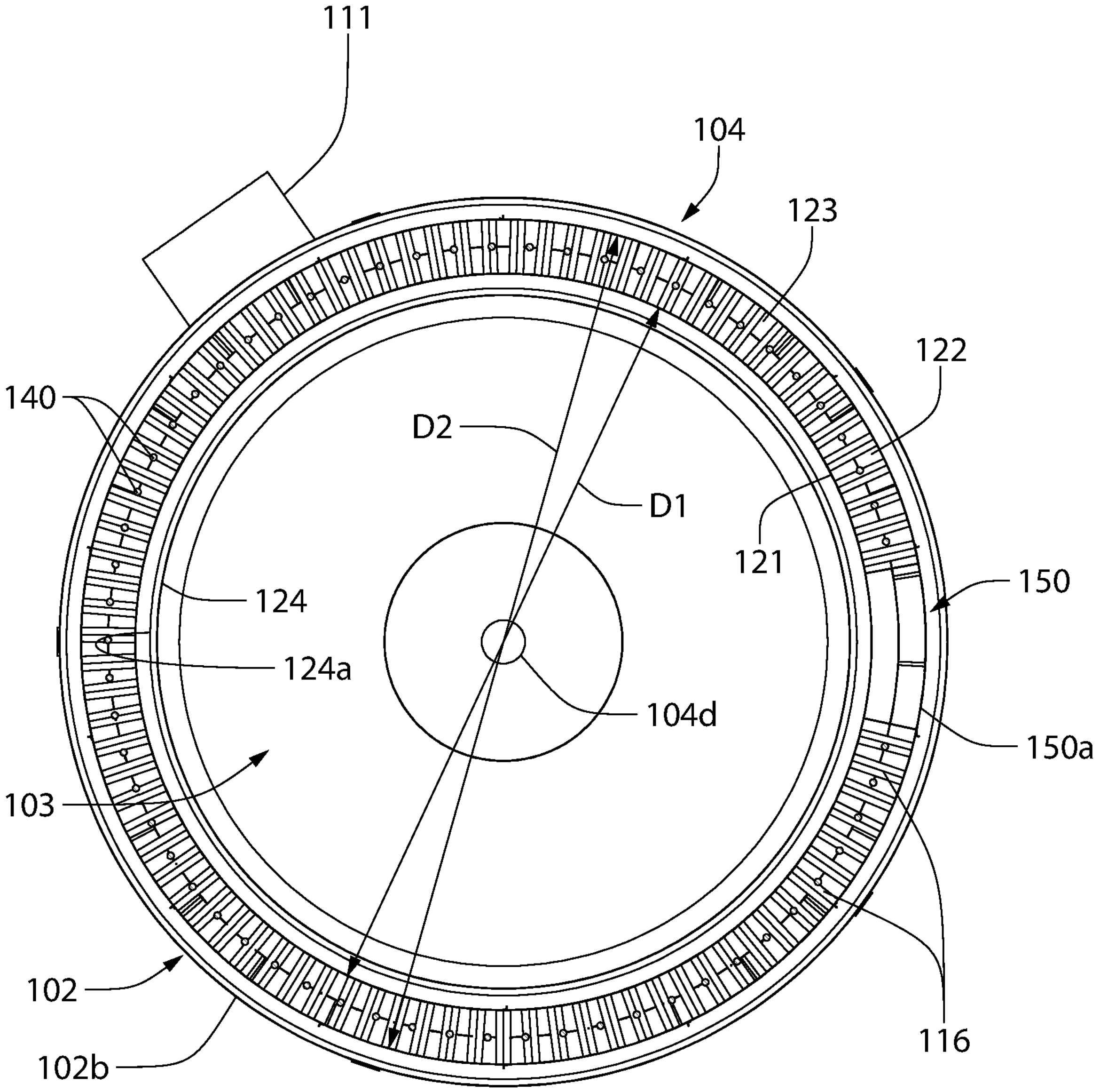
FIG. 12 is a second transverse cross sectional view taken through the primary collector of the precipitator as indicated in FIG. 9.
Figure 13:
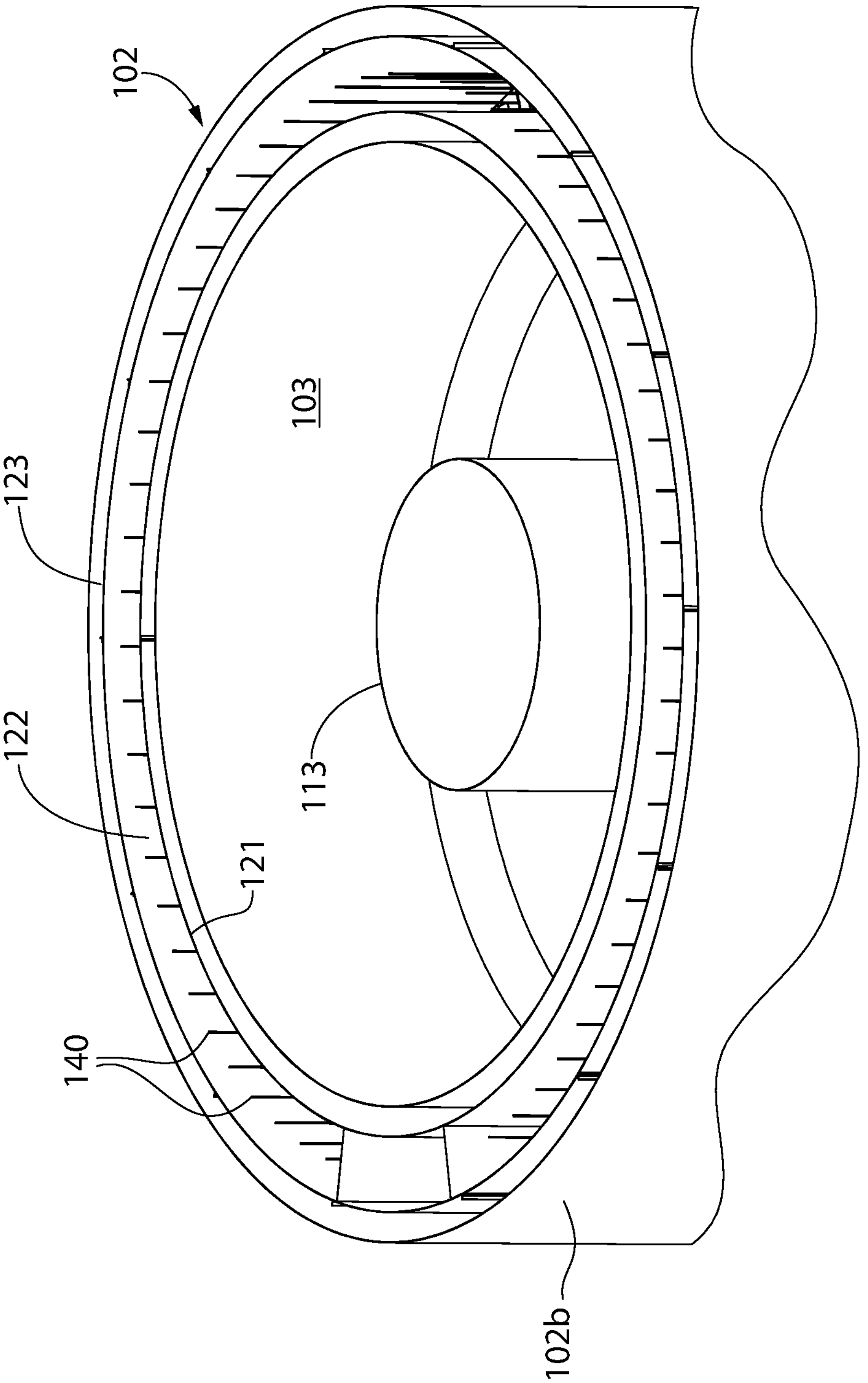
FIG. 13 is a cutaway top perspective view showing radial collecting walls, collection annulus formed therebetween, and electrode arrangement.
Figure 14:
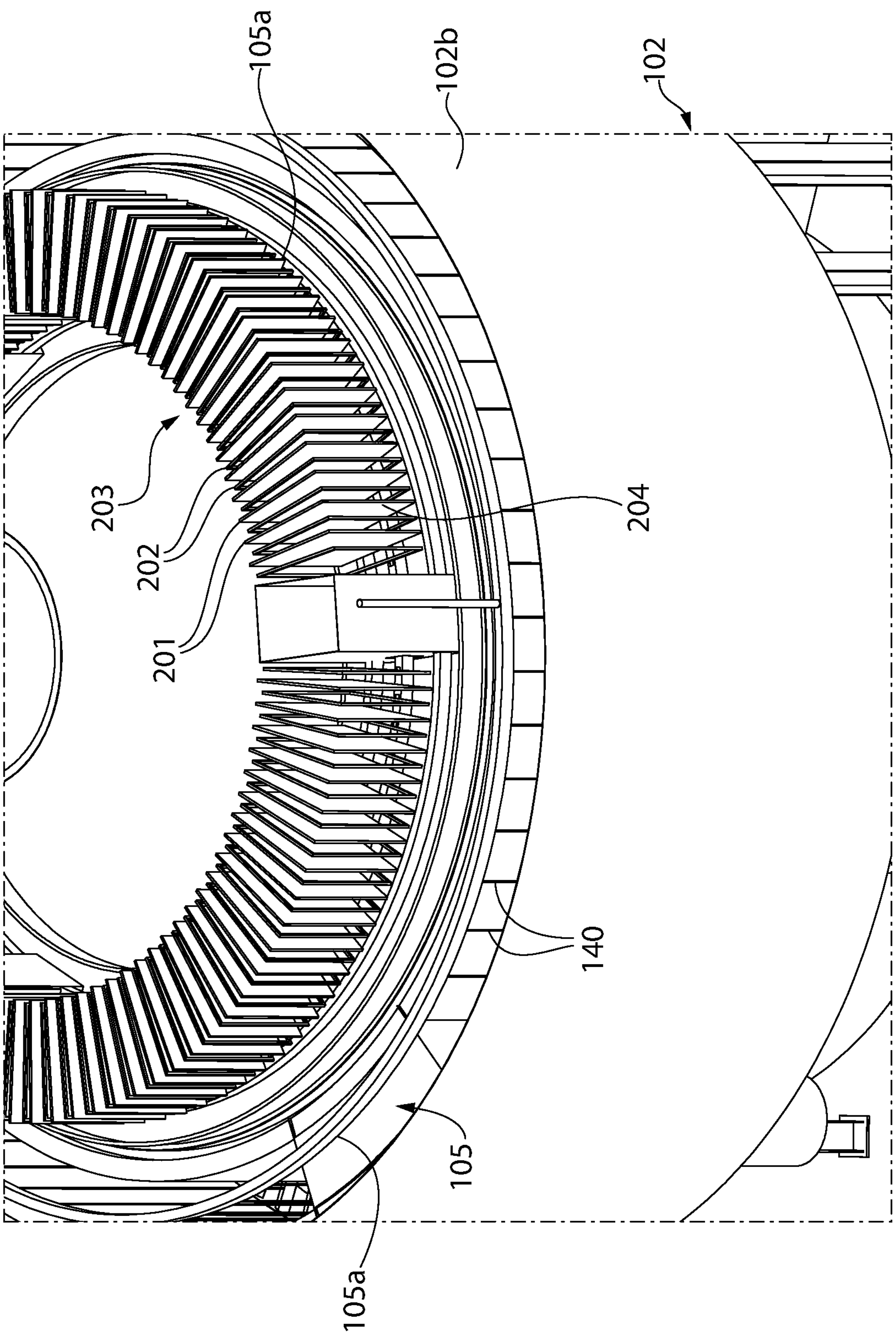
FIG. 14 is another cutaway top perspective view showing the secondary collector cassette comprising a circular array of collector plates and electrode plates.

In order to provide a gas-tight seal for the collection annulus 122 at top and bottom between inner and outer radial collecting walls 121, 123, water seals 170 may be provided near the top and bottom of each wall (four total) as shown schematically in FIG. 10 and schematically in FIG. 15. Each water seal comprises a water-filled annular seal trough 172 filled with water W supplied by an available pressurized water source. Troughs 172 may be formed of metal and L-shaped or U-shaped in some embodiments. The outboard troughs 172 are fixedly attached to the inside surface of the sidewall 102*b* of the WESP housing 102 (e.g., welded). The inboard seal troughs are fixedly attached to the vertical division wall 124 in the internal space 103 of the housing 102. The troughs therefore remain stationary with housing 102 relative to collecting walls 121, 123 which rotate therein. The seal troughs each extend circumferentially around the entirety of the collecting walls.

Water may be circulated continuously through the troughs 172 from the water source, or alternatively may be supplied thereto periodically via suitable water level sensors/switches and valves to replenish water evaporated by the heat emitted from the process gas. Either approach maintains a relatively constant level of water in each trough to concomitantly preserve the gas seal. Each seal trough has a water supply (albeit only two are shown as examples for brevity).

The water seals 170 each further include an annular seal plate 171 fixedly attached to the inner and outer radial walls 121, 123 such as via welding near the top and bottom of the walls as shown. Seal plates 171 may be L-shaped in one embodiment and have a vertical free section which is immersed at least partially in the water-filled seal troughs to form the gas-tight seal. The seal plates rotate through each of their respective troughs with the collecting walls 121, 123 as they rotate. The seal plates 171 and troughs 172 may be formed of a suitable metal such as steel. The water seals ensure that the process gas is directed to the secondary collector 200 from the collection annulus 122 and does not leak out into the interior of the WESP housing.

In other possible embodiments, it may be possible to utilize a single rotating collecting wall 121 or 123 in combination with stationary vertical division wall 124. In this case, the collection annulus 122 would be formed between the cylindrical divisional wall 124 and one of the collecting walls 121 or 123. The energized rod-like electrodes 140 function as before to energize the particles in the gas stream flowing through the annulus. The single electrically grounded collecting wall 121 or 123 is rotated through the collecting station 150 and particulate matter deposits are removed therefrom by a single drag chain 154 with scrapers 153. In certain embodiments, either collecting wall 121 or 123 may be energized and the remaining wall may grounded and serve to collect particulate matter from the gas stream which is removed in collecting station 150. This eliminates the rod-like electrodes 140 altogether. The energized wall 121 or 123 may be stationary. In yet other embodiments the stationary divisional wall 124 may instead be electrified to energize the particles in the gas stream and use in conjunction with one of the rotating collecting walls 121 or 123 which also eliminates the rod-like electrodes 140 altogether. Accordingly, it will be appreciated that numerous variations of the rotating collecting wall or walls design are possible within the scope of the present disclosure.

While the foregoing description and drawings represent some example systems, it will be understood that various additions, modifications, and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. An electrostatic precipitator system comprising:

a primary collector comprising:

an outer collecting wall circumscribing an inner collecting wall to define a collection annulus therebetween to receive an incoming gas stream therethrough; and an electrode disposed in the collection annulus, the electrode configured to be energized to electrically charge particles entrained in the incoming gas stream to cause the electrically charged particles to electrostatically collect on the inner and outer collecting walls; and a cleaning station configured to remove the collected particles from the inner and outer collecting walls while the electrode remains energized, wherein the inner and outer collecting walls are formed by cylindrical shells each being annular in structure;

wherein the inner and outer collecting walls are rotatable about a common rotational axis via a rotary drive mechanism.

2. The system according to claim 1, wherein the inner and outer collecting walls rotate through the cleaning station.

3. The system according to claim 1, wherein the inner and outer collecting walls rotate in unison.

4. The system according to claim 1, wherein the inner collecting wall is concentrically nested inside the outer collecting wall, the inner collecting wall comprising a convex collecting surface and the outer wall comprises a concave collecting surface opposing the convex collecting surface to form the collection annulus therebetween.

5. The system according to claim 1, wherein the inner collecting wall has a smaller diameter than the outer collecting wall.

6. The system according to claim 1, wherein the inner and outer collecting walls are electrically grounded to attract and remove the charged particles from the incoming gas stream.

7. The system according to claim 1, further comprising:

a stationary secondary collector configured to receive a gas stream exiting the primary collector;

each of the primary and secondary collectors disposed within an internal space of a housing.

8. The system according to claim 7, wherein the secondary collector is disposed above the primary collector to receive the gas stream exiting the primary collector.

9. The system according to claim 7, wherein the primary collector removes a majority of particles from the incoming gas stream.

10. The system according to claim 9, wherein the primary collector removes 90 percent or more of the particles from the incoming gas stream.

11. The system according to claim 7, wherein the secondary collector comprises a self-supporting cassette of flat plate collectors which comprise alternating electrode plates and grounded collecting plates.

12. The system according to claim 11, wherein the electrode plates and grounded collecting plates are spaced apart from each other and arranged in a circumferential array, the gas stream exiting the primary collector flowable through collection passages formed between adjacent electrode plates and grounded collecting plates.

13. The system according to claim 1, wherein the incoming gas stream flows vertically upwards through the collection annulus of the primary collector.

14. The system according to claim 1, wherein the electrode comprises a plurality of circumferentially spaced apart electrodes disposed in the collection annulus between the inner and outer collecting walls.

15. The system according to claim 14, wherein the primary collector is disposed within an internal space of a housing; and wherein the circumferentially spaced apart electrodes of the primary collector are suspended in the collection annulus from above by a high voltage frame supported by the housing via high voltage insulators.

16. The system according to claim 2, wherein the cleaning station comprises a pair of drag chain conveyors each including a plurality of vertically moving scrapers, the scrapers on each drag chain conveyor being configured and operable to engage a respective one of the inner and outer collecting walls as the inner and outer collecting walls rotate through the cleaning station and remove the collected particles therefrom.

* * * * *